(12) United States Patent
Schmal et al.

(10) Patent No.: US 6,986,921 B2
(45) Date of Patent: *Jan. 17, 2006

(54) THERMOPLASTIC ELASTOMER FILMS

(75) Inventors: Michael D. Schmal, Orwigsburg, PA (US); Ernest E. Bachert, Orwigsburg, PA (US); John A. Menges, Auburn, PA (US); Robert R. Witt, Marengo, IL (US)

(73) Assignee: M&Q Plastic Products, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 10/706,351

(22) Filed: Nov. 12, 2003

(65) Prior Publication Data

US 2004/0247806 A1 Dec. 9, 2004

Related U.S. Application Data

(63) Continuation of application No. 09/918,042, filed on Jul. 30, 2001, now Pat. No. 6,682,792.

(60) Provisional application No. 60/274,573, filed on Mar. 26, 2001.

(51) Int. Cl.
*B32B 1/08* (2006.01)
*B32B 5/12* (2006.01)
*B32B 3/04* (2006.01)

(52) U.S. Cl. .................. 428/35.2; 428/36.6; 428/37.6; 428/105; 428/106; 428/112; 428/113; 428/114; 428/118; 428/128; 428/129; 428/130; 428/913

(58) Field of Classification Search ............... 428/35.2, 428/36.6, 37.6, 105, 106, 112, 113, 114, 118, 428/128, 129, 130, 913; 525/1–540
See application file for complete search history.

(56) References Cited

U.S. PATENT DOCUMENTS

| | | | |
|---|---|---|---|
| 3,907,926 A | 9/1975 | Brown et al. | 260/860 |
| 4,264,667 A | 4/1981 | Murakami et al. | 428/195.1 |
| 4,469,851 A | 9/1984 | Charles et al. | 525/44 |
| 4,734,142 A | 3/1988 | Creswell | 156/73.1 |
| 4,929,656 A | 5/1990 | Golder | 524/195 |
| 5,123,985 A | 6/1992 | Evans et al. | 156/213 |

(Continued)

OTHER PUBLICATIONS

Encyclopedia of Polymer Science and Technology, 1985, 12, 76-177.
Perry's Chemical Handbook, 1997, Chapter 18, 29-32.

*Primary Examiner*—Harold Pyon
*Assistant Examiner*—Patricia L. Nordmeyer
(74) *Attorney, Agent, or Firm*—Woodcock Washburn LLP

(57) ABSTRACT

The present invention is directed to thermoplastic elastomer films and bags made from thermoplastic elastomer films and also to methods for making thermoplastic elastomer films and bags. The thermoplastic elastomer films of the present invention are composed of thermoplastic elastomers and non-elastic polyesters. The bags of the present invention are fabricated using blended monolayer thermoplastic films that include a blend of thermoplastic elastomer and a non-elastic polyester, or co-extruded multi-layer films that include at least one layer of thermoplastic elastomer and at least one layer of non-elastic polyester. The blended monolayer thermoplastic films of the present invention are useful in the food handling industry and particularly in the meat packaging industry and for use in cooking bag applications. The co-extruded films of the present invention are also useful in the food handling industry and particularly the meat packaging industry and for use in meat casing applications.

31 Claims, 14 Drawing Sheets

U.S. PATENT DOCUMENTS

| | | | |
|---|---|---|---|
| 5,480,945 A | 1/1996 | Vicik | 525/432 |
| 5,632,843 A | 5/1997 | Lustig et al. | 156/275.5 |
| 5,635,261 A | 6/1997 | Georgelos et al. | 428/35.4 |
| 5,698,279 A | 12/1997 | Vicik | 428/34.8 |
| 5,914,386 A | 6/1999 | Berendse et al. | 528/272 |
| 6,135,281 A | 10/2000 | Simhaee | 206/390 |
| 6,146,764 A | 11/2000 | Suokas et al. | 428/412 |
| 6,686,792 B2 | 2/2004 | Nakamiya et al. | 327/535 |

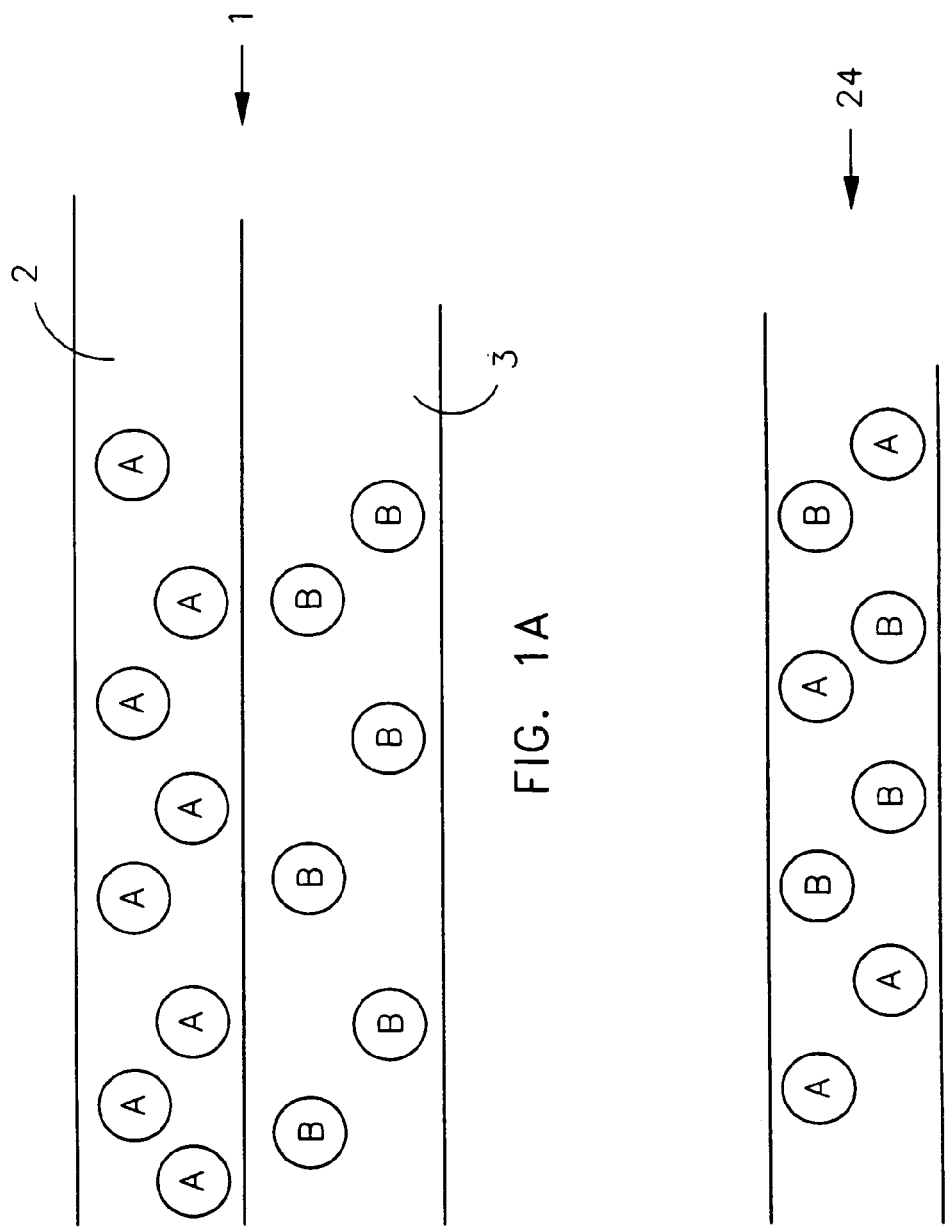

THERMOPLASTIC ELASTOMER FILMS

CROSS REFERENCE TO RELATED APPLICATIONS

This application is a continuation of U.S. application Ser. No. 09/918,042, filed Jul. 30, 2001, now U.S. Pat. No. 6,682,792 issued on Jan. 27, 2004 which claims benefit of U.S. provisional application Ser. No. 60/274,573, filed Mar. 26, 2001, entitled "Thermoplastic Elastomer Film" the contents of which is herein incorporated by reference in its entirety.

FIELD OF THE INVENTION

The present invention relates generally to films that are used for food service applications, and more, particularly, to thermoplastic elastomer films that can be used to package food products for storage and transportation and for high temperature cooking applications and meat casing applications.

BACKGROUND OF THE INVENTION

Various thermoplastic films have been used to package, preserve, and encase food products. Conventional compositions of films include polypropylene, polyethylene, nylon, ethylene vinyl acetate, polyvinylidene chloride, and ethylene/acrylic acid copolymer. An optional adhesive layer may be employed to combine films.

Bags made from conventional films are used in steam or hot water cooking applications, however, they are not well suited for high temperature cooking applications, such as cooking beef, because they either melt or adhere to food products retained in the bag. It is desirable to fabricate bags composed of materials that cleanly strip away from food products, such as, for example, meat products, during cooking applications. Conventional bags are also limited in their ability to be used in high pressure meat casing applications where meat is stuffed into the casing because they are subject to high elongation when heated.

It is also desirable to have bags that exhibit good mechanical properties at a low cost. The food packaging industry is constantly in search of stronger, more durable bags that are resistant to tearing and abrasion so as to completely isolate the food product from the outside environment to prevent any contaminants from entering the bag. The thickness of conventional bags is often increased at additional cost to achieve preferred mechanical properties, such as tear resistance and durability.

The food packaging industry is also searching for compositions that enable bags to be made at a lower cost. The food packaging industry attempts to reduces cost by using thin films because bags fabricated from lower thickness films typically require less materials to produce. The amount of thermoplastic elastomer used to make a film directly correlates to the overall cost of manufacturing the bag. Therefore, it is desirable to use lower thickness films to reduce the amount of material used and thus the cost of the film. It is also desired to improve the seal strengths of conventional bags in order to reduce the cost of materials. Higher seal strengths mean that a lower thickness film, and therefore less thermoplastic elastomer is required to fabricate bags.

Furthermore, it is desired that conventional bags form a barrier to gases and moisture from the outside environment. Bags that exhibit good barrier properties, such as being able to reduce or eliminate moisture and gas migration though the bag, are also desired. Oxygen migration in particular should be minimized because any oxygen that enters the bag may cause the contents of the bag, such as meat products, to spoil and/or discolor.

Sealing conventional thermoplastic films is typically accomplished by applying sufficient heat and pressure to adjacent film surfaces for a sufficient time to cause a fusion bond between the layers. However, heat sealed cylindrical bags are often imperfectly sealed because the heat necessary to seal the folds of tubular stock will harm the barrier properties of the film by either overly thinning the film layer or melting through the film. Imperfect seals are a large problem, particularly in cooking applications and when used with heat shrinkable film, because exposure to elevated temperatures and heat shrinking increases the stress on the seals. As a result, many manufacturers use ultrasonic sealing techniques or mechanical closing devices to seal conventional films.

Ultrasonic sealing techniques, however, are not desired to seal thermoplastic elastomer films, such as for example, copolyester films, because the elastic structure of the films dampens the transmission of ultrasonic energy thereby preventing the complete sealing of this type of conventional bag. Therefore, mechanical sealing devices, such as for example, clips, rings or the like, are usually preferred in place of ultrasonic sealing when thermoplastic elastomer films are used. Typically, these mechanical sealing devices are made of a plastic or metal material.

Several undesirable characteristics are associated with mechanical sealing devices. Mechanical sealing devices can become a source of contamination if lost in the food product. Metal sealing devices cannot be used in microwave ovens for cooking or defrosting of the food product contained in the bags, and the metal clips sometimes migrate into the product, thereby giving rise to customer complaints. Therefore, it is desirable to have methods of sealing thermoplastic elastomer bags that eliminate the need for a mechanical device and also resolves the sealing problems associated with heat sealed and ultrasonically sealed bags.

Therefore there is a need for improved thermoplastic elastomer films and methods of making bags from these films that overcome the drawbacks and problems associated with conventional films and methods of making bags composed of conventional films.

SUMMARY OF THE INVENTION

The present invention is directed to thermoplastic elastomer films and bags made from thermoplastic elastomer films and also to methods for making thermoplastic elastomer films and bags. The thermoplastic elastomer films of the present invention are composed of thermoplastic elastomers and non-elastic polyesters. The bags of the present invention are fabricated using blended monolayer thermoplastic film that include a blend of thermoplastic elastomer and a non-elastic polyester, or co-extruded multi-layer films that include at least one layer of thermoplastic elastomer and at least one layer of non-elastic polyester. The blended monolayer thermoplastic film of the present invention are useful in the food handling industry and particularly in the meat packaging industry and for use in cooking bag applications. The co-extruded multi-layer films of the present invention are also useful in the food handling industry and particularly the meat packaging industry and for use in meat casing applications.

The films of the present invention include co-extruded multi-layered films having at least one layer of thermoplastic elastomer and at least one layer of non-elastic polyester. The preferred thermoplastic elastomers are polyether-ester block copolymers or polyester-ester block copolymers. In another embodiment of the present invention polyether-ester block copolymers or polyester-ester block copolymers and non-elastic polyesters are admixed in a melt and extruded to form a single layered film. The more preferred thermoplastic elastomers are polyether-ester block copolymers.

The films of the present invention have improved mechanical properties, particularly higher tensile strength and therefore higher resistance to tearing and abrasion, elevated melting points, increased tensile modulus, higher tensile yield strengths, lower tensile yield elongation, and higher tensile break strength. Increased tensile modulus, and therefore increased stiffness of the films of the present invention make it easier to handle and fabricate bags out of these films. Higher tensile yield strength means the films require a higher force to make the films yield or stretch beyond their elastic region thereby enabling a more controlled stretch when used to package meat. Films with high tensile yield strength produce a more consistent diameter sausage when used as a meat casing. Films of the present invention produce tighter and more consistent diameter meat casings when used in pressurized casing applications because the films have lower tensile yield elongation as compared to conventional films. Tensile yield elongation measures the amount of elongation that occurs before the film finally stretches away and yields beyond its elastic point. Films of the present invention also exhibit increased tensile break elongation compared to monolayer films of thermoplastic elastomer thereby enabling their use in almost any meat packaging application because the films will stretch less before the film breaks.

Bags of the present invention are fabricated from thermoplastic films that are fused together by sealing techniques selected from the group including heat sealing techniques such as wire impulse sealing techniques, impulse sealing techniques, rotary heat sealing, hot knife heat sealing, and ultrasonically sealing techniques. Ultrasonic sealing techniques are preferably used to fabricate the bags of the present invention. More preferably, bags are formed by ultrasonic sealing techniques known as star sealing. Additional features of the present invention are set forth below.

DESCRIPTION OF THE DRAWINGS

The numerous features and advantages of the present invention may be better understood by those skilled in the art by reference to the accompanying detailed description and the following drawing, in which:

FIG. 1A is a cross sectional view of an exemplary multi-layered thermoplastic elastomer film;

FIG. 1B is a cross sectional view of an exemplary blended monolayer thermoplastic elastomer film;

DETAILED DESCRIPTION OF THE PREFERRED EMBODIMENTS

Figure 1C:
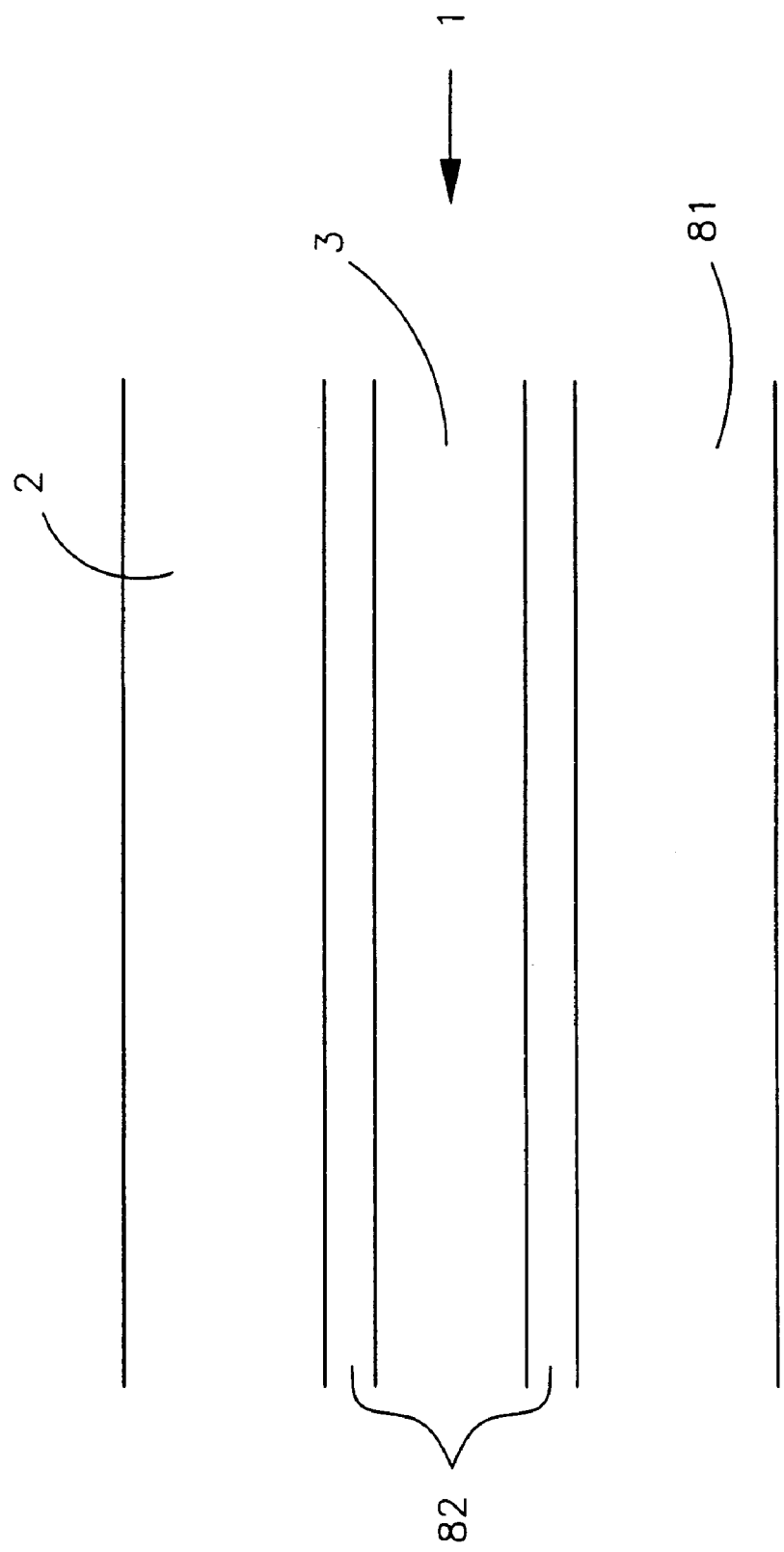
FIG. 1C is a cross sectional view of an exemplary multi-layered thermoplastic elastomer film.

The present invention is directed to thermoplastic elastomer films and bags made from thermoplastic elastomer films and also to methods for making thermoplastic elastomer films and bags. The thermoplastic elastomer films of the present invention are composed of thermoplastic elastomers and non-elastic polyesters. The bags of the present invention are fabricated using blended monolayer thermoplastic elastomer films that include a blend of thermoplastic elastomer and a non-elastic polyester, or co-extruded multi-layer films that include at least one layer of thermoplastic elastomer and at least one layer of non-elastic polyester. The blended monolayer thermoplastic films of the present invention are useful in the food handling industry and particularly in the meat packaging industry and for use in cooking bag applications. The co-extruded films of the present invention are also useful in the food handling industry and particularly the meat packaging industry and for use in meat casing applications. As used herein "bag" means bags at traditionally defined, vacuum bags, casings, pouches, sacks, and containers used to hold meat products for packaging and transportation. Casings means food product casings for food products that are packaged in link-form including but not limited to sausage casings, keilbasa casings, lunch meat casings, and hot dog casings. Product means food products, meat products, explosive products, fiberglass products and any products that require elastic packaging that restricts moisture and oxygen migration.

The films and bags of the present invention exhibit improved mechanical properties that help isolate food products retained by bags composed of the film from the outside environment thereby preventing any contaminants from entering the bag. The improved mechanical properties also enable the use of lower thickness films to fabricate bags and thereby lower the cost of bags composed of the films.

Improved mechanical properties, in particularly include higher tensile strength and therefore higher resistance to tearing and abrasion, elevated melting points, increased tensile modulus, higher tensile yield strengths, lower tensile yield elongation, and higher tensile break strength. Increased tensile modulus, and therefore increased stiffness of the films of the present invention make it easier to handle and fabricate bags out of these films. Higher tensile yield strength measurements means the films require a higher force to make the films yield or stretch beyond their elastic region thereby enabling a more controlled stretch when used to package meat. Films with high tensile yield strength producing a more consistent diameter sausage when used as a meat casing. Films of the present invention produce tighter and more consistent diameter meat casings when used in pressurized casing applications because the films have lower tensile yield elongation as compared to conventional films. Tensile yield elongation measures the amount of elongation that occurs before the film finally stretches away and yields beyond its elastic point. Films of the present invention also exhibit increased tensile break elongation thereby enabling their use in almost any meat packaging application because the films will stretch less before the film breaks.

The films and bags of the present invention also exhibit improved barrier properties, including the ability to reduce or eliminate moisture and gas migration though bags composed of the films. Bags made from the thermoelastomer film exhibit less oxygen migration, and less moisture transmission as compared to conventional bags. The improved mechanical and barrier properties of the thermoplastic film are exhibited in both the blended monolayer thermoplastic elastomer films and the co-extruded multilayered thermoplastic elastomer films.

The addition of non-elastic polyesters to thermoplastic elastomers in multi-layered films and as a component of blended films makes it easier to ultrasonically star seal bags made from the films of the present invention as compared to bags made from conventional materials. In addition, the ultrasonic seal is stronger than seals created using conventional materials or heat sealing techniques.

Single layered and multi-layered bags containing a thermoplastic elastomer and non-elastic polyester do not adhere to food products, specifically meat products retained in the bag. Bags made from blended monolayered thermoplastic films improved their non-stick adherence properties as the amount of non-elastic polyester in the blended film is reduced. Bags made from multi-layered co-extruded films have the additional advantage of having a film layer composed of substantially thermoplastic elastomer in contact with food products retained in the bags. The layer of substantially thermoplastic elastomer will have an insubstantial amount of adherence to food products, specifically meat products. Therefore, bags made from multi-layered co-extruded films possess all the benefits of cost, mechanical properties and barrier properties while not adhering to meat products during storage, transportation, and cooking applications.

Bags of the present invention can be used in steam cooking applications, hot water cooking applications, and in high temperature cooking applications. The bags of the present invention are particularly useful for cooking beef or other meats or meat products that require high temperature for preparation because the bags will not melt or adhere to the food product contained within the bag at high temperatures. As used herein, high temperature cooking refers to temperatures from about 212° F. to about 400° F., and more particularly from about 250° F. to about 350° F.

The methods for making thermoplastic films of the present invention include co-extruding a multi-layered thermoplastic films or extruding blended monolayer thermoplastic films. Multi-layered films are made by co-extruding a thermoplastic elastomer and non-elastic polyester in separate layers. Blended monolayer thermoplastic films are made by preparing a melt blend of thermoplastic elastomer and non-elastic polyester and extruding the melt blend.

In one embodiment, the method of fabricating bags of the present invention include making tube shaped films, called tubular stock, and using at least one ultrasonic seal, called a star seal, to seal the bag. Other methods of fabricating bags in accordance with the present invention include the use of heat sealing techniques to seal tubular stock or non tube shaped films of the present invention.

FIG. 1A is a cross sectional view of an exemplary multi-layered thermoplastic elastomer film. FIG. 1B is a cross sectional view of an exemplary blended monolayer thermoplastic elastomer film. The films of the present invention include co-extruded multi-layered films 1 having at least one layer of thermoplastic elastomer 2 and at least one layer of non-elastic polyester 3. The films of the present invention also include blended monolayer thermoplastic elastomer films 24. The preferred thermoplastic elastomers are polyether-ester block copolymers or polyester-ester block copolymers. In another embodiment of the present invention polyether-ester block copolymers or polyester-ester block copolymers and non-elastic polyesters are admixed in a melt and extruded to form a single layered film. The more preferred thermoplastic elastomers are polyether-ester block copolymers.

Polyether-ester block copolymers are multi block copolymers in which crystallizable segments and low crystallinity segments alternate repeatedly. Thermoplastic elastomers are usually prepared by melt trans-esterification of a caboxylic acid, or its methyl ester, a polyalkylene oxide, and a short chain diol. A comprehensive description of polyether-ester block copolymers, polyester-ester block copolymers, non-elastic polyesters, and the synthesis thereof can be found in the appropriate chapters of the Encyclopedia of Polymer Science and Technology, Vol. 12, page 76–177 (1985) which is herein incorporated by reference.

The polyether-ester block copolymers and polyester-ester block copolymers are commercially available under different trademark names. For example, Arnitel® from DSM Engineering Inc., Hytrel® from DuPont and Riteflex® from Ticona are common registered trademarked names for polyether-ester and polyester-ester block copolymers. A preferred thermoplastic elastomer is the Arnitel® product line commercially available from DSM Engineering. A more preferred thermoplastic elastomer is Arnitel® EM630. Non-elastic polyesters are also commercially available under different registered trademarked names, for example, Celanex® from Ticona, Arnite® from DSM Engineering, and Crastin® from DuPont are suitable non-elastic polyesters. A preferred non-elastic polyester is Celanex® 1700A. Depending upon the desired mix of characteristics, those skilled in the art will be able to choose the most appropriate thermoplastic elastomer and non-elastic polyester. The film of the present invention may further contain optional additives, for example stabilizers, dyes or pigments, fillers, processing aids, heat stabilizers, anti-block additives, slip additives, and the like.

Films of the present invention include co-extruded multi-layered films that include at least one layer of thermoplastic elastomer 2 that is about 5 percent to about 95 percent of the total film thickness and at least one layer of non-elastic polyester 3 that is about 95 percent to about 5 percent of the total film thickness. Preferably the thermoplastic elastomer layer 3 is from about 10 percent to about 50 percent of the total film thickness and the non-polyester elastomer layer 3 is from about 90 percent to about 50 percent of the total film thickness.

Films of the present invention also include blended mono layer films 24 of from about 10 to about 90 weight percent thermoplastic elastomer and about 90 to about 10 weight percent non-elastic polyester. Preferably blends include from about 40 to about 60 weight percent thermoplastic elastomer and about 60 to about 40 weight percent non-elastic polyester. More preferred blends include about 50 weight percent thermoplastic elastomer and 50 weight percent non-elastic polyester.

In one embodiment of the present invention, the polyetherester block copolymers and polyesterester block copolymers include the repeating alternating ester units of cystallizable polyester segments A and low crystallinity polyester segments B. Segment A preferably has a molecular weight from about 400 to about 6000. Segment B preferably has a molecular weight from about from about 100 to about 550.

Segment A is derived from at least one dicarboxylic acid and at least one glycol. Segment A is crystallizable with a preferred crystallinity above about 35%, and more preferably above about 50%. Suitable diboxylic acids are selected from a group comprising aliphatic acids, cycloaliphatic acids, and aromatic acids. Aromatic dicarboxylic acids are a preferred dicarboxylic acid. Preferred aromatic dicarboxylic acids are selected from the group comprising phthalic, isophthalic or terephthalic acid, naphthalenedicarboxylic acids and diphenyldicarboxylic acids. Preferably, the dicarboxylic acids have from about 8 to about 16 carbon atoms. Preferred dicarboxylic acids are terephthalic acids. Repeating A segments of butylene terephthalate units are more preferred.

Suitable polyalkylene glycols for segment A are long chain glycols with terminal or near terminal hydroxy groups. Preferred alkylene glycols are selected from the group comprising polyethylene oxide, poly(1,2- and 1,3) propylene oxide, polybutylene oxide, tetramethylene oxide, or copolymers thereof. Polybutylene oxide is a more preferred alkylene glycol.

Segment B includes repeating units derived from at least one diol and a dicarboxylic acid. Segment B is a low crystallinity block with a crystallinity below about 30%. Suitable diols include aliphatic, cycloaliphatic, and aromatic dihydroxy compounds. Preferred diols have from about 2 to about 15 carbon atoms, such as ethylene, propylene, butylene, tetramethylene, etc. Even more preferred diols are butanediols or tetramethylene diols. Equivalent ester forming derivatives of diols are also useful, for example, ethylene carbonate, or ethylene oxide. A suitable alkylene carbonate can be represented by the formula:

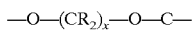

wherein R is a hydrogen atom, an alkyl group, or an aryl group, x is from about 2 to about 20. Preferably R is a hydogen atom, x=6, and the alkylene carbonate is therefore hexamethylene carbonate.

The composition segments A and B may vary within wide limits and are primarily determined by the desired mechanical properties. Thus, copolyester elastomers having a high content of A have a greater rigidity and higher melting point. On the other hand, copolyester elastomers having a high content of B are much more flexible and these materials have a lower melting point. The weight ratio of A segments to B segments in the copolyester elastomers will vary from about 10:80 to about 80:10. Preferably the weight ratio is from about 10:60 to about 60:10, and more preferably from about 60:40 to about 40:60.

Non-elastic polyesters that can be used with the present invention are preferably derived from a dicarboxylic acid and a diol. Preferred diols are alkylene glycols that form long chains and thereby facilitate crystal formation. Preferably non-elastic polyester crystallinity is at least about 35%, and more preferably at least about 50%. Preferred alkylene glycols are selected from the group comprising polyethylene oxide, poly(1,2- and 1,3) propylene oxide, polybutylene oxide, or combinations thereof. Polybutylene oxide is a more preferred alkylene glycol. Preferred dicarboxylic acids are selected from the group terephthalic, phthalic, isophthalic, or combinations thereof. More preferred decarboxylic acids are terepthalic acids so that non-elastic polyesters comprised of butylene terephthalate are more preferred. The dicarboxylic acid or the diol may optionally be substituted as long as the substituted group does not hinder crystal formation.

Films in accordance with the present invention are preferably made by extrusion processes that are well known in the art. A description of such extrusion processes can be found in Perry's Chemical Engineering Handbook, Ch. 18, pp. 29–32 (1997) which is herein incorporated by reference.

Figure 2A:
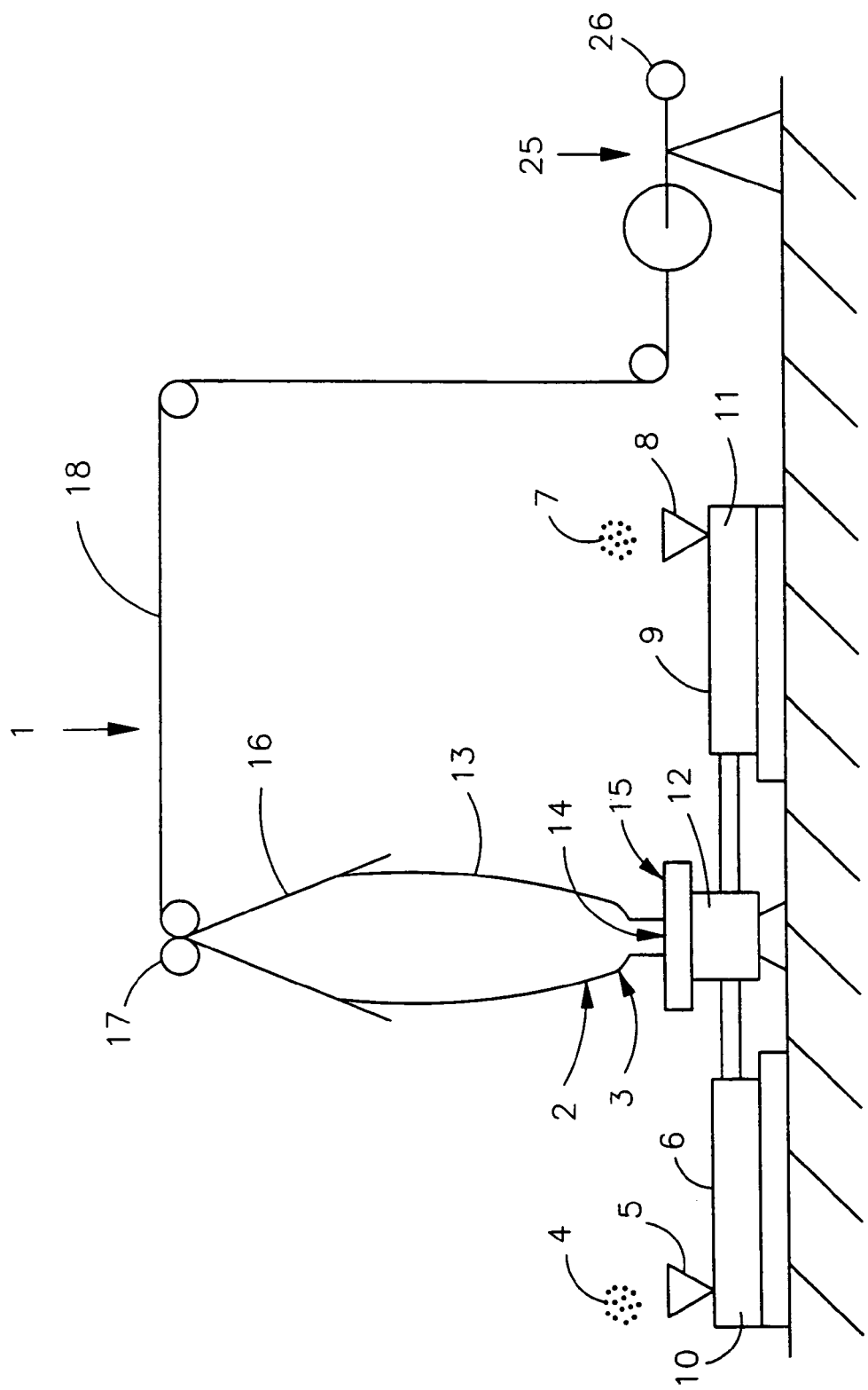
FIG. 2A is a side view of an exemplary blown extrusion apparatus for multi-layered thermoplastic films.

FIG. 2A shows a side view of an exemplary blown film extrusion apparatus for multi-layered co-extruded films. Multi-layered co-extruded films of the present invention are made by pouring thermoplastic elastomer resin pellets 4 into the resin hopper 5 of a first extruder 6 and pouring non-elastic polyester resin pellets 7 into the resin hopper 8 of a second extruder 9. Any conventional type of extruder may be used, including, single screw, double screw, and/or tandem extruders. Thermoplastic elastomer resin pellets 4 from the resin hopper 5 of the first extruder 6 are fed into the first extruder 6 and non-elastic polyester resin pellets 7 from the resin hopper 8 of the second extruder 9 are fed into the second extruder 9. The thermoplastic elastomer resin pellets 4 and the non-elastic polyester resin pellets 7 are melted in the first extruder 6 and the second extruder 9 respectively to form melted resins of thermoplastic elastomer 10 and non-elastic polyester 11. Any optional additives that are used may be added to melted resins 10 and 11 in first extruder 6 and second extruder 9 and/or may be added with resin pellets 4 and 7. The first extruder 6 and the second extruder 9 are connected at their end by a die 12.

The first extruder 6 and second extruder 9 push melted resins 10 and 11 through die 12 to form a film of thermoplastic elastomer 2, or first layer, and a film of non-elastic polyester 3, or second layer. Preferably, die 12 permits a film of thermoplastic elastomer film 2 and a second film of non-elastic polyester 3 to be extruded simultaneously to form a multi-layered film 1 once cooled.

Thermoplastic elastomer film 2 and non-elastic polyester film 3 exit die 12 and are cooled by contacting a region of reduced temperature and pressure relative to the temperature and pressure within the first extruder 6 and second extruder 9. Typically, the region of reduced temperature and pressure is the ambient atmosphere, but may also include being rolled onto a chilled roller. The sudden reduction in temperature and pressure causes the thermoplastic elastomer film 2 and non-elastic polyester film 3 to solidify upon cooling to form multi-layered film 1. The layered film is gathered by a winder that winds the film into rolls.

In a preferred embodiment, the multi-layered film 1 is co-extruded in a blown film extrusion process. The die 12 connecting the first extruder 6 and the second extruder 9 in a blown film process is annular, or ring-shaped, such that the first extruder 6 and second extruder 9 force thermoplastic elastomer film 2 and non-elastic polyester film 3 out of die 12 in the shape of a tube 13. Die 12 has an aperture 14 positioned in the center of its top face 15. Aperture 14 is annular or circular in shape to permit a blowing agent to inflate tube 13 of thermoplastic elastomer film 2 and non-elastic polyester film 3 as it exits die 12. The blowing agent increases the tube 13 diameter and decreases its thickness. Tube 13 is blown against a collapsing frame 16 that guides the tube into a pair of rollers 17. The rollers 17 flatten the tube 13 to form a tubular stock of film 18. The tubular stock 18 is then wound into a roll 26 for transportation and storage. Preferably when the thermoplastic films are in use the thermoplastic elastomer film 2 is the interior layer and the non-elastic polyester film 3 is the exterior layer of the stock of film 18. It is preferred that thermoplastic elastomer is in direct contact with the products retained in bags made from films of the present invention.

FIG. 1C is a cross sectional view of an exemplary multi-layered thermoplastic elastomer film. Referring to FIG. 1C, in another preferred embodiment, the multi-layered film 1 includes at least one additional layer 81. Each of the additional layers 81 is made from a thermoplastic elastomer block copolymer, non-elastic polyester, or combination thereof. The multilayered thermoplastic film 1 can be fabricated by co-extruding first layer 2, the second layer 3, and each of the at least one additional layers 81 to form said multilayered thermoplastic film 1. Alternatively, the multi-layered thermoplastic film 1 can be fabricated by extruding the first layer 2, the second layer 3, and each of the at least one additional layers 81 individually. To form multi-layered thermoplastic film 1, the second layer 3 is disposed on the first layer 2 and each of the at least one additional layers 81 is disposed on the second layer 3. The first layer 2, the second layer 3, and each of said at least one additional layers 81 are then rolled between a heated roller to form the multilayered thermoplastic film 1. Alternatively, the multi-layered thermoplastic film 1 can be fabricated by disposing an interleaving adhesive layer 82 between the first layer 2 and the second layer 3. Further, an interleaving adhesive layer 82 is then disposed between each of the additional layers 81.

Figure 2B:
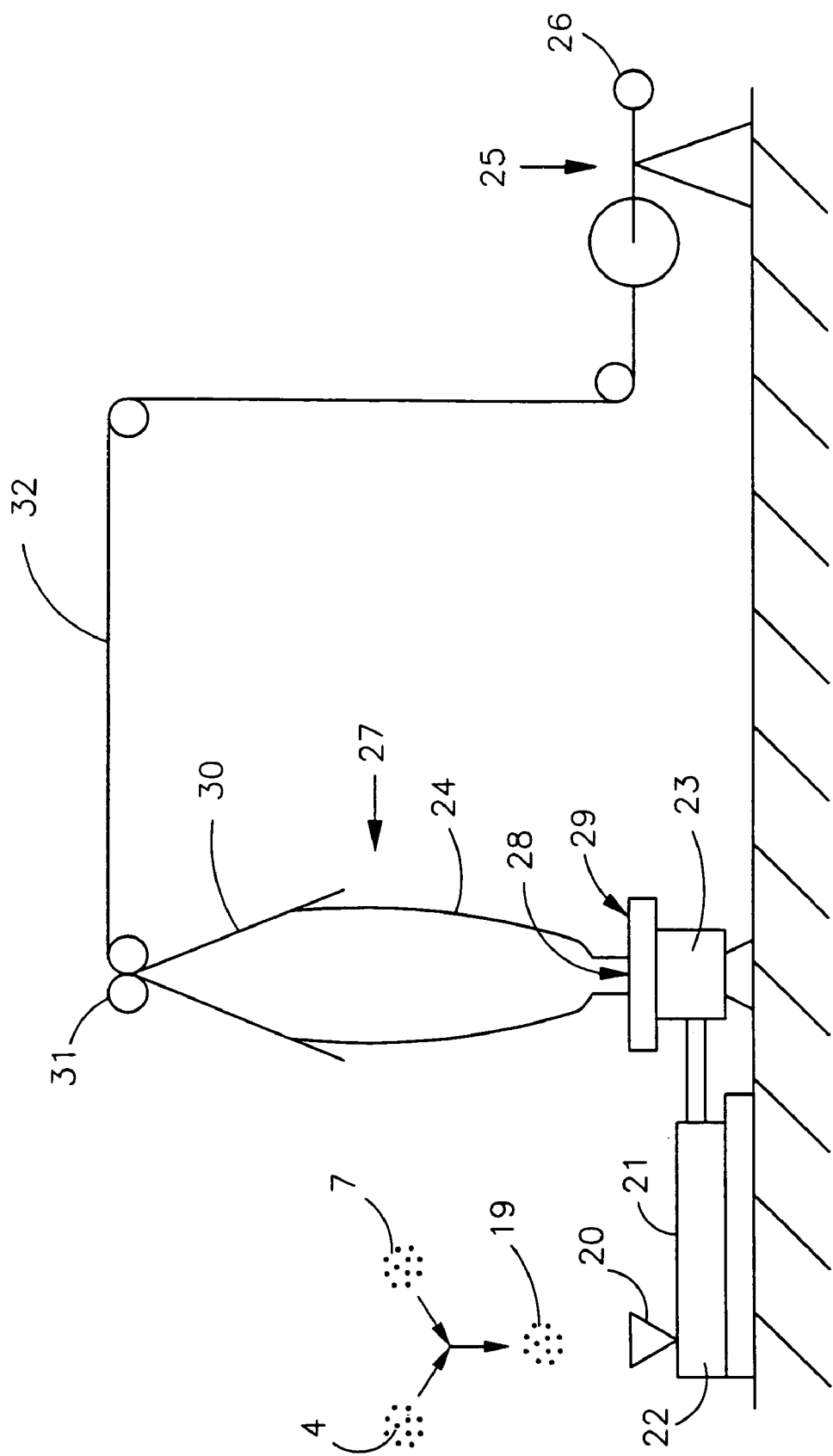
FIG. 2B is a side view of an exemplary blown extrusion apparatus for blended monolayer thermoplastic films.

FIG. 2B shows a side view of an exemplary blown extrusion apparatus for blended monolayer thermoplastic films. Blended monolayer thermoplastic films 24 are made by combining and admixing thermoplastic elastomer resin pellets 4 and non-elastic polyester resin pellets 7 sufficiently to form a blend 19 that is substantially homogenous. Blend 19 is then poured into a resin hopper 20 of an extruder 21. Any conventional type of extruder may be used, including, single screw, double screw, and/or tandem extruders. Any optional additives that are used may be added to the melted resin in each extruder and/or may be added with resin pellets 4 and 7. Resin hopper 20 feeds blend 19 into extruder 21. Blend 19 is melted and mixed within extruder 21 to form a melt blend 22 that includes thermoplastic elastomers and non-elastic polyesters. Extruder 21 pushes melt blend 22 through a die 23 at the end of extruder 21. Extruder 21 forces melt blend 22 through die 23 to form a blended monolayer thermoplastic film 24. As the blended monolayer thermoplastic film 24 exits die 23 it contacts a region of reduced temperature and pressure relative to the temperature and pressure within extruder 21. Typically, the region of reduced temperature and pressure is the ambient atmosphere, but may also include being rolled onto a chilled roller. The sudden reduction in temperature and pressure causes the blended film 24 to solidify upon cooling. Blended monolayer thermoplastic film 24 is gathered by a winder 25 that winds the blended film 24 into rolls 26.

In a preferred embodiment, melt blend 22 is extruded in a blown film extrusion process. In a blown film process, die 23 at the end of extruder 21 is annular, or ring-shaped, such that extruder 21 forces the melt blend 22 out of die 23 in the shape of a tube 27. Die 23 has an aperture 28 positioned in the center of its top face 29. Aperture 28 is annular or circular in shape to permit a blowing agent to inflate the tube 27 as it exits the die 23. The blowing agent increases the tube 27 diameter and decreases the thickness of the blended monolayer thermoplastic film 24 forming tube 27. Tube 27 is blown against a collapsing frame 30 that guides tube 27 into a pair of rollers 31. The pair of rollers 31 flatten tube 27 to form a tubular stock of film 32. The tubular stock of film 32 is then wound into a roll 26 for transportation and storage.

Preferably, the films are as thin as possible, in order to minimize the amount of resin necessary to fabricate food product bags while at the same time providing rugged durability and a low gas and moisture transmission rates. Preferably thermoplastic elastomer film 2, and non-elastic polyester film 3 each independently have a gauge thickness of from about 0.0001 to about 0.01 inches. More preferably, films of the present invention preferably have a total gauge thickness from about 0.0005 inches to about 0.0035 inches, and even more preferably from about 0.001 inches to about 0.0025 inches.

The films may be optionally stretch oriented. The term "stretch-oriented" is used herein to describe the process and resultant product characteristics obtained by stretching and immediately cooling a resinous polymeric material which has been heated to its orientation temperature so as to revise the molecular configuration of the material by physical alignment of the molecules to improve certain mechanical properties of the film such as, for example, tensile strength and tear strength, shrink properties as well as the optical properties of the film. In the context of the present invention, stretch-orientation decreases the moisture and gas transmission rates i.e., improves the moisture vapor barrier functionality of the film, and also increases the toughness and shrinkability of the film in comparison to films that are not stretch-oriented.

The film sheets are optionally stretch-oriented by reheating the quenched film sheet to its orientation temperature and then stretching the film. The orientation temperature for a given film will vary with the different resinous polymers and blends thereof which include the film, and will generally be a range of temperatures based on such factors. In general, the orientation temperature may be stated to be above room temperature and below the melting point of the film, and will typically be at or near the glass transition temperature of the resins from which the film is made.

The process of stretching a film at its orientation temperature range may be accomplished in a number of ways such as, for example, by "double bubble" or "tenter framing" techniques. These and other techniques are well known in the art and involve stretching the film in the cross or transverse direction (TD) and/or in the longitudinal or machine direction (MD). When the stretching force is applied in one direction, uniaxial orientation results. When the stretching force is applied in two directions, biaxial orientation results. After being stretched, the film is rapidly cooled to quench and thus set or locked-in the oriented molecular configuration. Such an oriented and quenched film is said to be "heat-shrinkable," i.e., without heat-setting as described immediately below, the film will tend to return toward its original, unoriented (unstretched) dimensions when subsequently heated to an appropriate temperature below its melting temperature range.

After locking-in the oriented molecular configuration by quenching, film sheets may also be heat-set by bringing the oriented film to a temperature near its orientation temperature while restraining the film in its stretched dimensions. This process, which is also know as "annealing," produces a film with substantially less shrinkability, while retaining much of the advantages of orientation, including improved tensile strength and optical properties, as well as lower gas and moisture transmission rates.

The films are preferably stretch-oriented in at least two directions, i.e., "biaxially oriented," preferably in both the machine direction and transverse direction. Further, the films preferably have an orientation ratio of at least about 2 in both of the directions in which they have been oriented. As used herein, the phrase "orientation ratio" refers to the multiplication product of the extent to which a film is expanded in any one direction during the orientation process. Thus, an orientation ratio of, e.g., 2 in the machine direction, indicates that the film has been expanded to twice its original dimension in the machine direction of the film. When a film is biaxially oriented, the orientation ratios are conventionally expressed as "[machine direction (MD) ratio]×[transverse direction (TD) ratio]" or "[TD ratio]×[MD ratio]," however designated. Thus, a biaxial orientation ratio of 2 in the MD and 3 in the TD would be expressed as a "MD×TD orientation ratio of 2×3."

Bags of the present invention are fabricated from thermoplastic films that are fused together by sealing techniques selected from the group including heat sealing techniques such as wire impulse sealing techniques, impulse sealing techniques, rotary heat sealing, hot knife heat sealing, or by ultrasonically sealing techniques. Ultrasonic sealing techniques are preferably used to fabricate the bags of the present invention. More preferably, bags are formed by ultrasonic sealing techniques called star sealing.

Thermoplastic elastomer films are preferably produced in the form of tubular stock such that bags can be produced therefrom by sealing one end of a length of tubular film or by sealing both ends of the tube end then slitting one edge to form the bag mouth. Alternatively, the bags can be made from flat sheets of films, by sealing three edges of two superimposed sheets of film or alternatively by folding a rectangular sheet in half and sealing the two sides proximate to the folded side.

Figure 3:
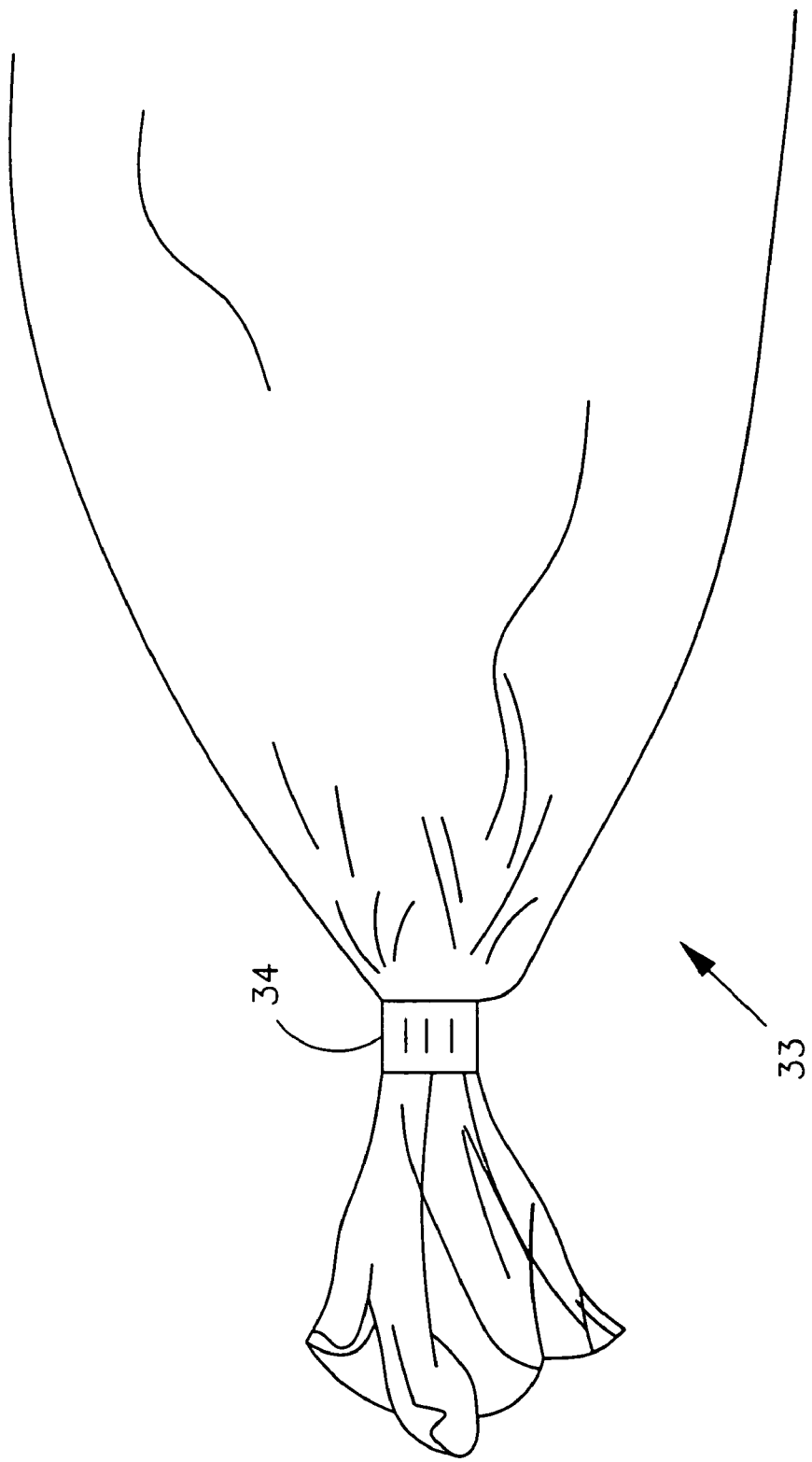
FIG. 3 is a side view of an exemplary bag formed from tubular stock that is star sealed.
Figure 4:
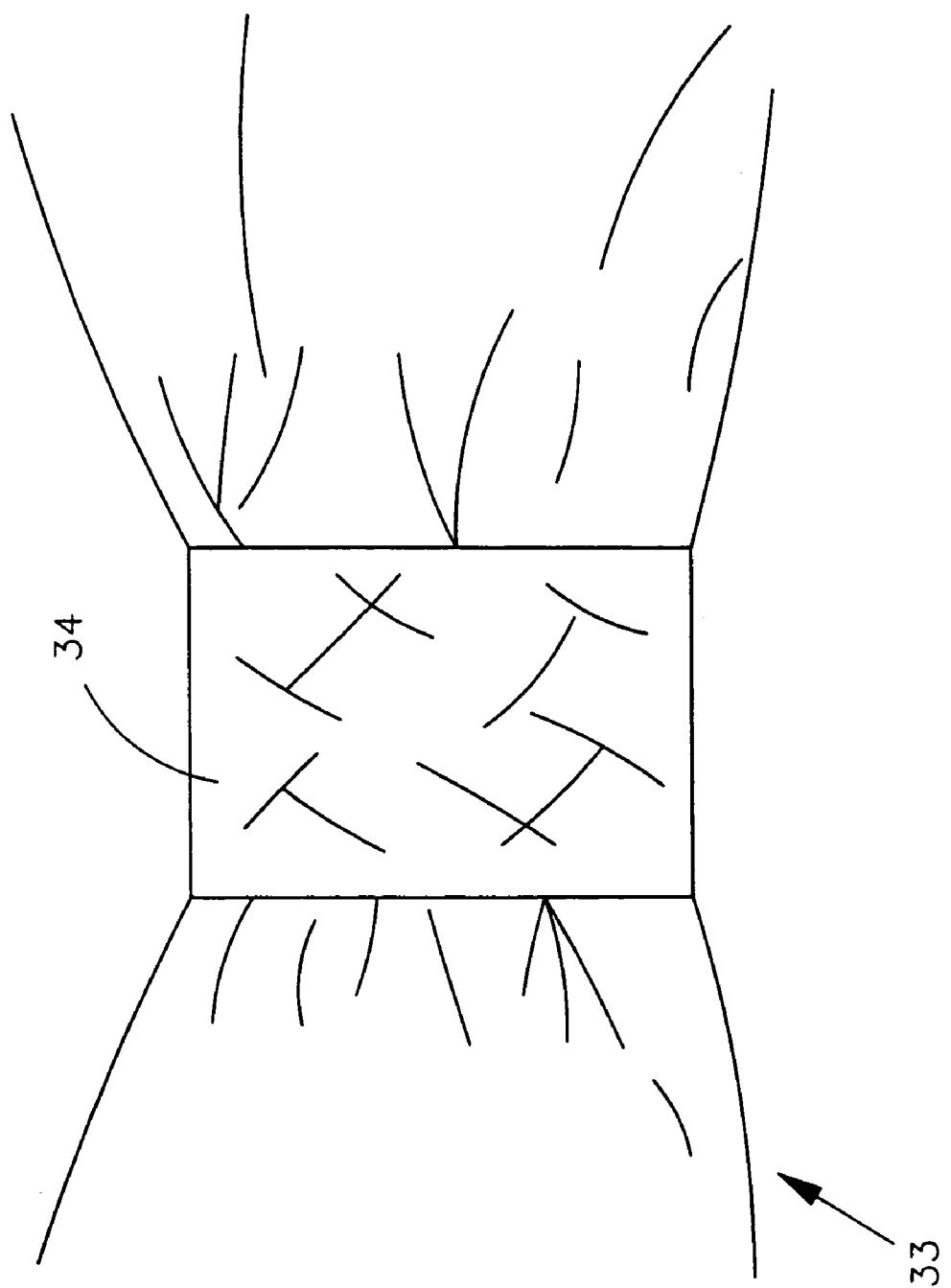
FIG. 4 is a side view of an exemplary star seal.

FIG. 3 shows a side view of an exemplary bag formed from tubular stock that has been star sealed. FIG. 4 shows a side view of an exemplary star seal. Referring to FIG. 3 and FIG. 4, a bag 33 according to the present invention can be formed using ultrasonic sealing devices capable of forming a star seal 34. A star seal 34 is formed by tightly twisting, bunching, and/or gathering a tubular stock of film into a wad thereby forming wadded tubular stock as described below. The wadded tubular stock is then sealed using ultrasonic sealing techniques to form a star seal as described below.

Figure 5A:
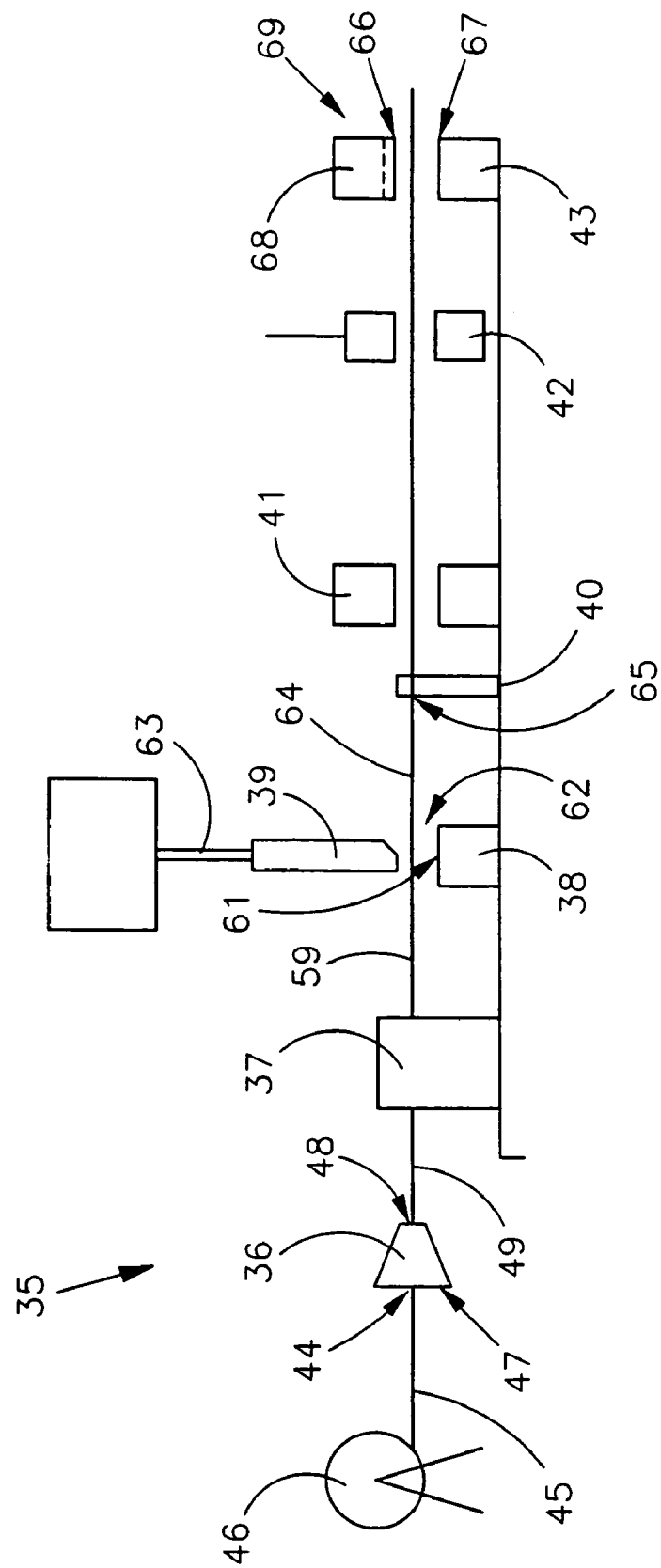
FIG. 5A is a side view of an exemplary star sealing bag machine.
Figure 5B:
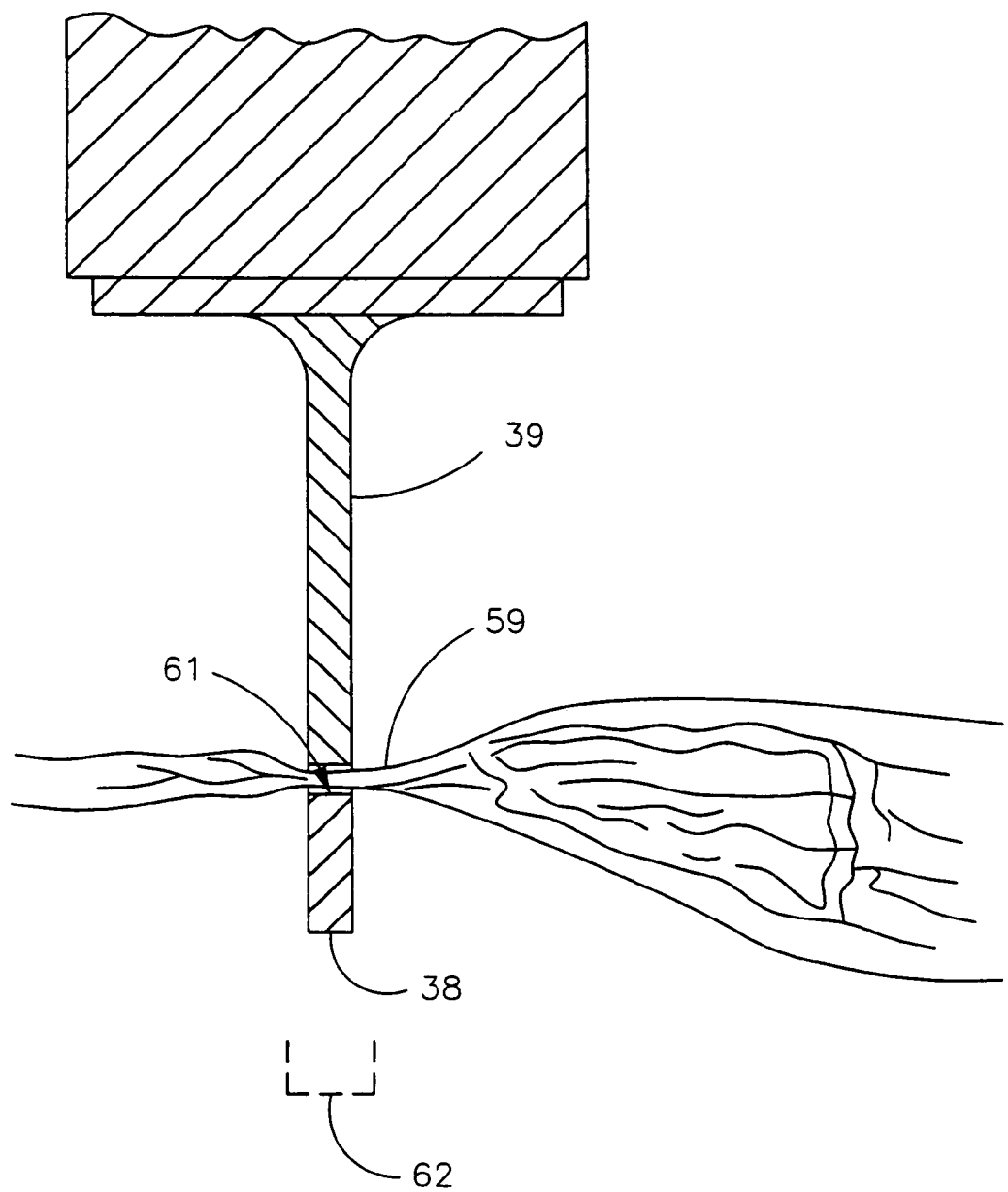
FIG. 5B is a side view of an exemplary sealing zone.
Figure 6:
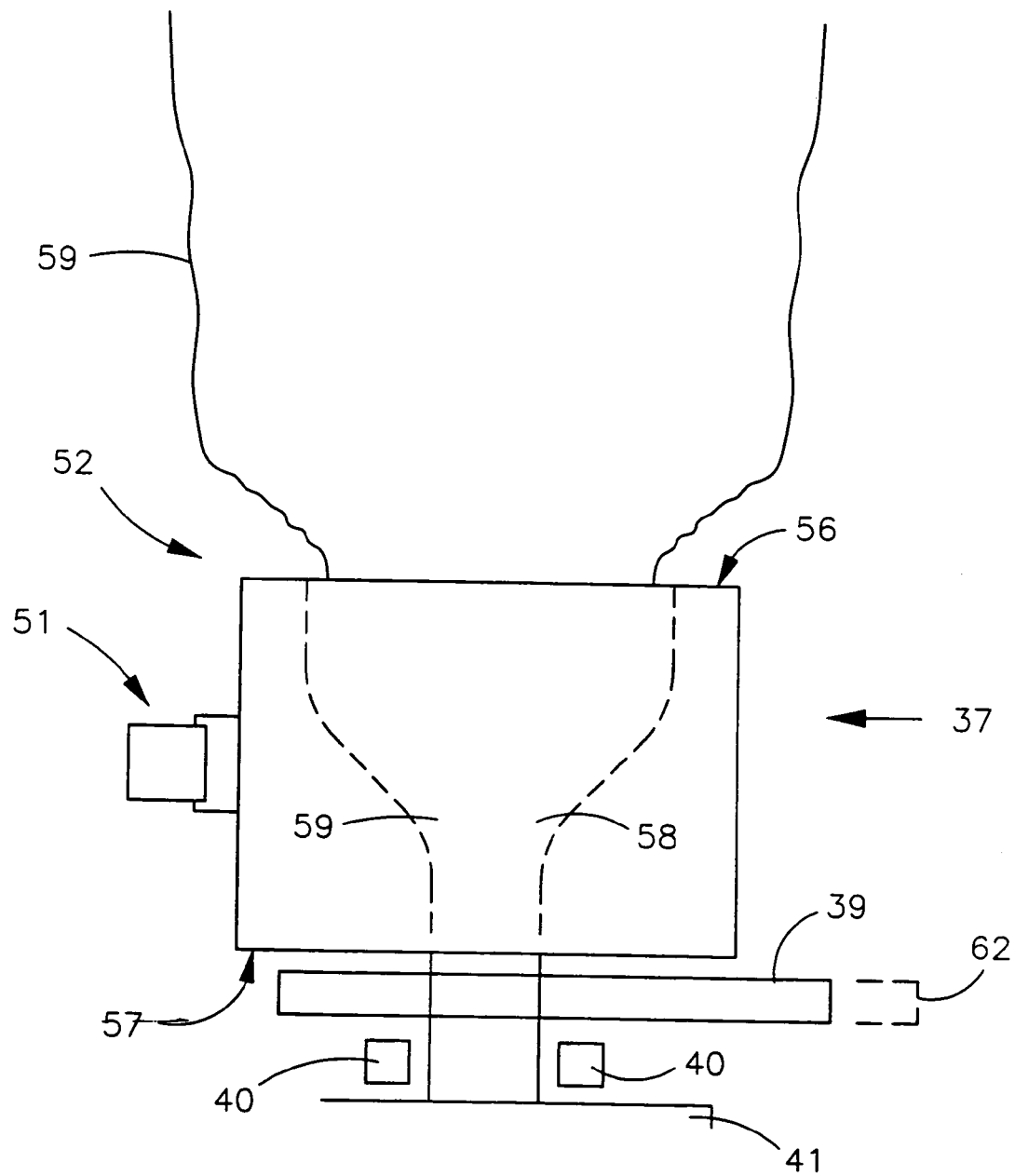
FIG. 6 is a top view of the star seal bag machine of FIG. 5A.

FIG. 5A is a side view of an exemplary star sealing bag machine. FIG. 5B is a side view of an exemplary sealing zone; FIG. 6 is a top view of the exemplary star seal bag machine of FIG. 5. As shown in FIG. 5A, FIG. 5B and FIG. 6, one embodiment of an acceptable ultrasonic sealing machine 35 includes a gathering horn 36, a twisting fixture 37, an anvil 38, an ultra sonic sealing horn 39, at least one guide member 40, a first clamp 41, a second clamp 42, and a cutting member 43.

Gathering horn 36 includes an elongated aperture 44 for receiving tubular stock 45 from a roll of tubular stock 46, a front surface 47 and a back surface 48. Elongated aperture 44 connects the front surface 47 to the back surface 48. Elongated aperture 44 narrows from the front surface 47 to the back surface 48 such that the circumference of elongated aperture 44 decreases. Narrowing of the elongated aperture 44 wads tubular stock 45 into a rope like structure, called wadded tubular stock 49, as it passes through gathering horn 36.

Figure 7:
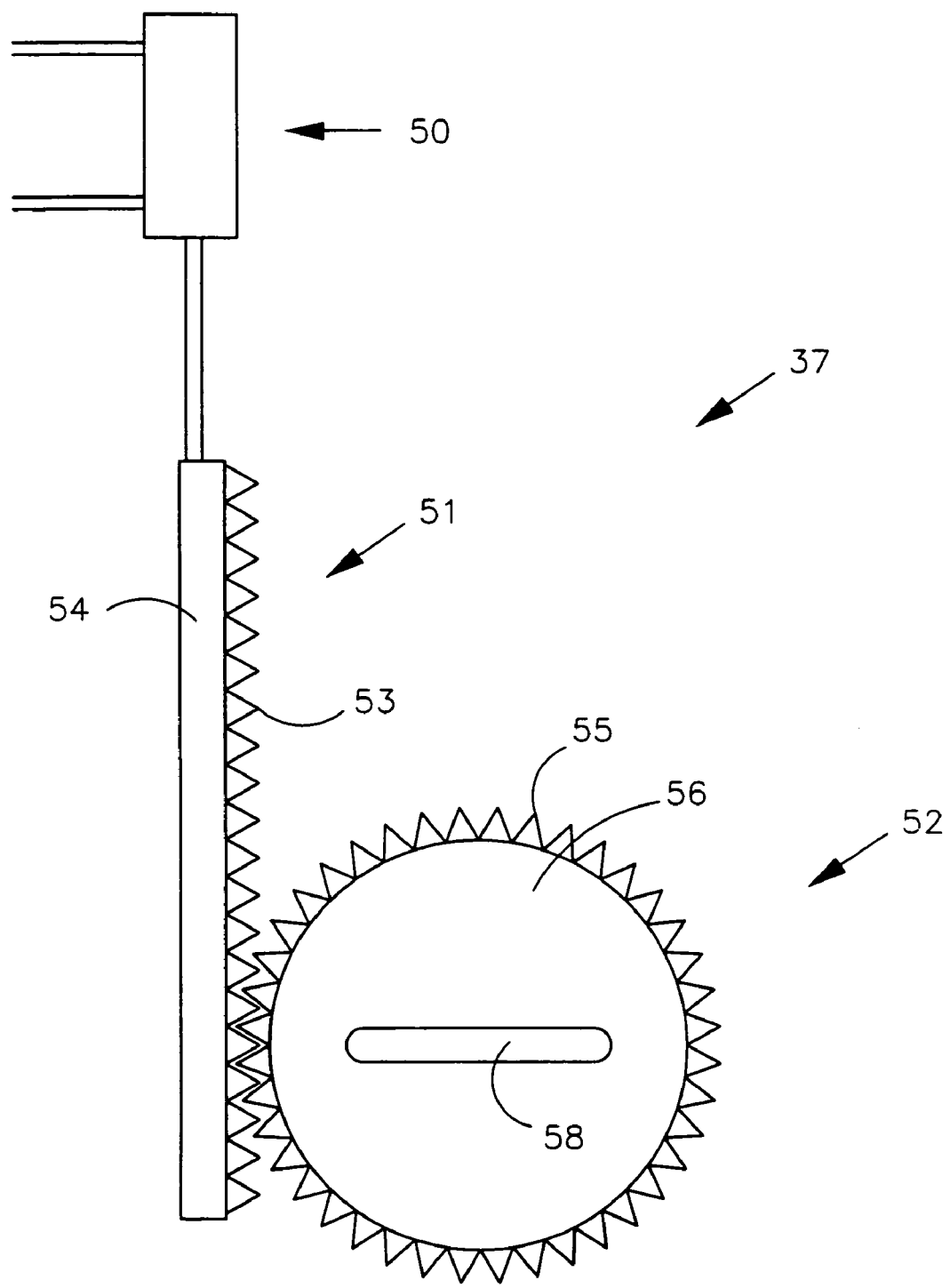
FIG. 7 is a front view of an exemplary twist fixture.
Figure 8:
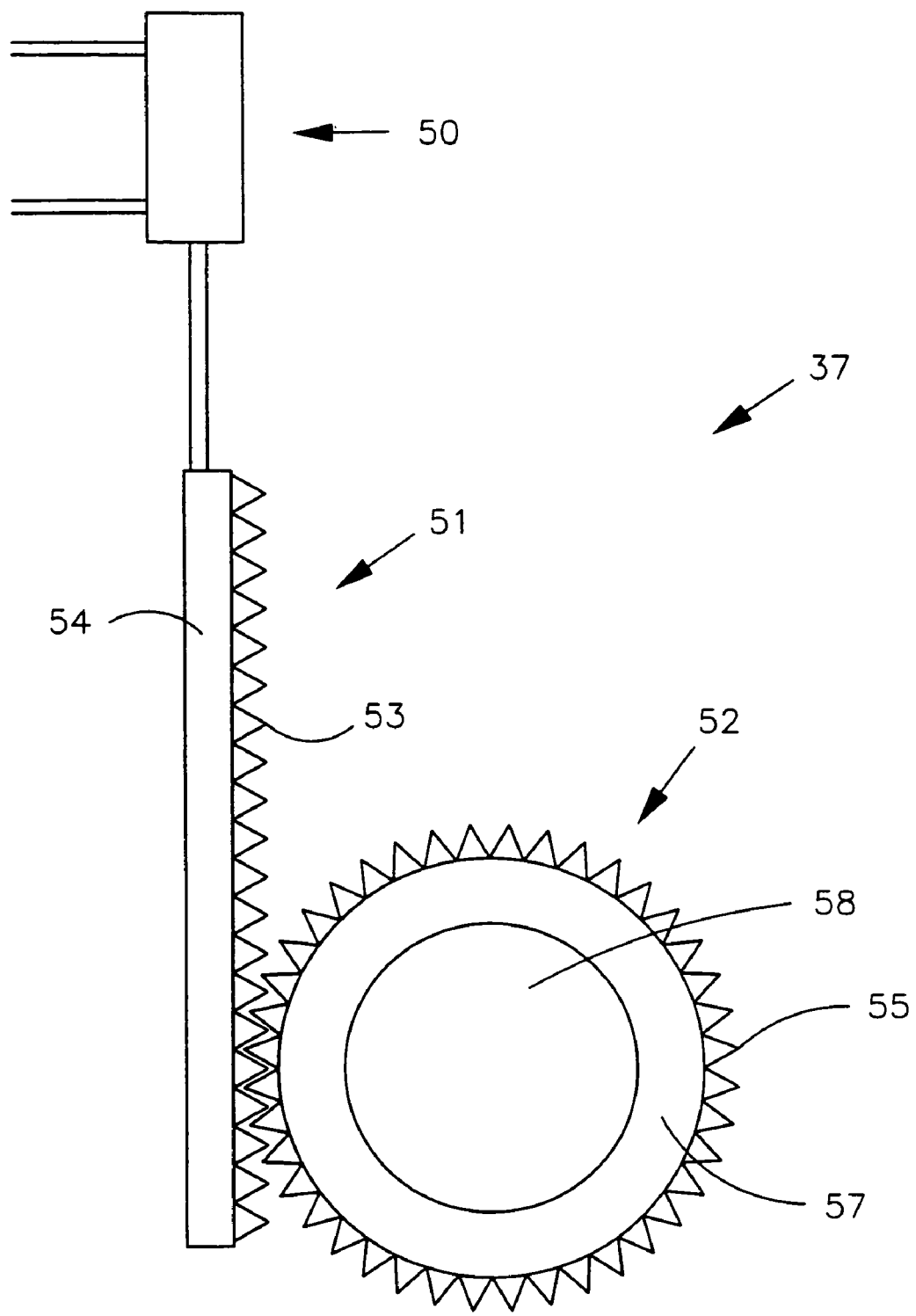
FIG. 8 is a back view of the twist fixture of FIG. 7.

FIG. 7 and FIG. 8 are front and back views of an exemplary twist fixture. Referring to FIG. 6, FIG. 7, and FIG. 8, twisting fixture 37 includes an air cylinder 50, a geared ratchet 51, at least one twisting member 52. Air cylinder 50 is operatively attached to geared ratchet 51 and articulates the geared ratchet 51. Geared ratchet 51 is operatively attached to at least one twisting member 52 and includes a length of gear teeth 53 on an elongated member 54. A twisting member 52 includes gears 55 that are operatively associated with gear ratchet 51, a front surface 56, a back surface 57, and an aperture 58 formed to receive wadded tubular stock 49. Aperture 58 connects front surface 56 to back surface 57. Aperture 58 narrows from the front surface 56 to the back surface 57 such that the circumference of aperture 58 decreases from front to back. As shown, the shape of aperture 58 in the front surface is elongated, preferably in the shape of an oval. The shape of aperture 58 in the back surface 57 is circular. Wadded tubular stock 49 is disposed in twisting member 52 through aperture 58.

Twisting fixture 37 articulates from a non twisted position to a twisted position. In a non-twisted position, air cylinder 50 is at rest, and geared ratchet 51 is biased away from twisting member 52. In a twisting position, air cylinder 50 biases geared ratchet 51 toward twisting member 52 causing twisting member 52 to rotate about its x-axis. Twisting is accomplished by disposing wadded tubular stock 49 within twisting member 52 while twisting member 52 is in a non-twisting position and articulating twisting member 52 from a non-twisting position to a twisting position. While articulating twisting member 52 from a twisting position to a non-twisting position wadded tubular stock 49 is twisted to form twisted tubular stock 59. (See FIG. 5).

Figure 9:
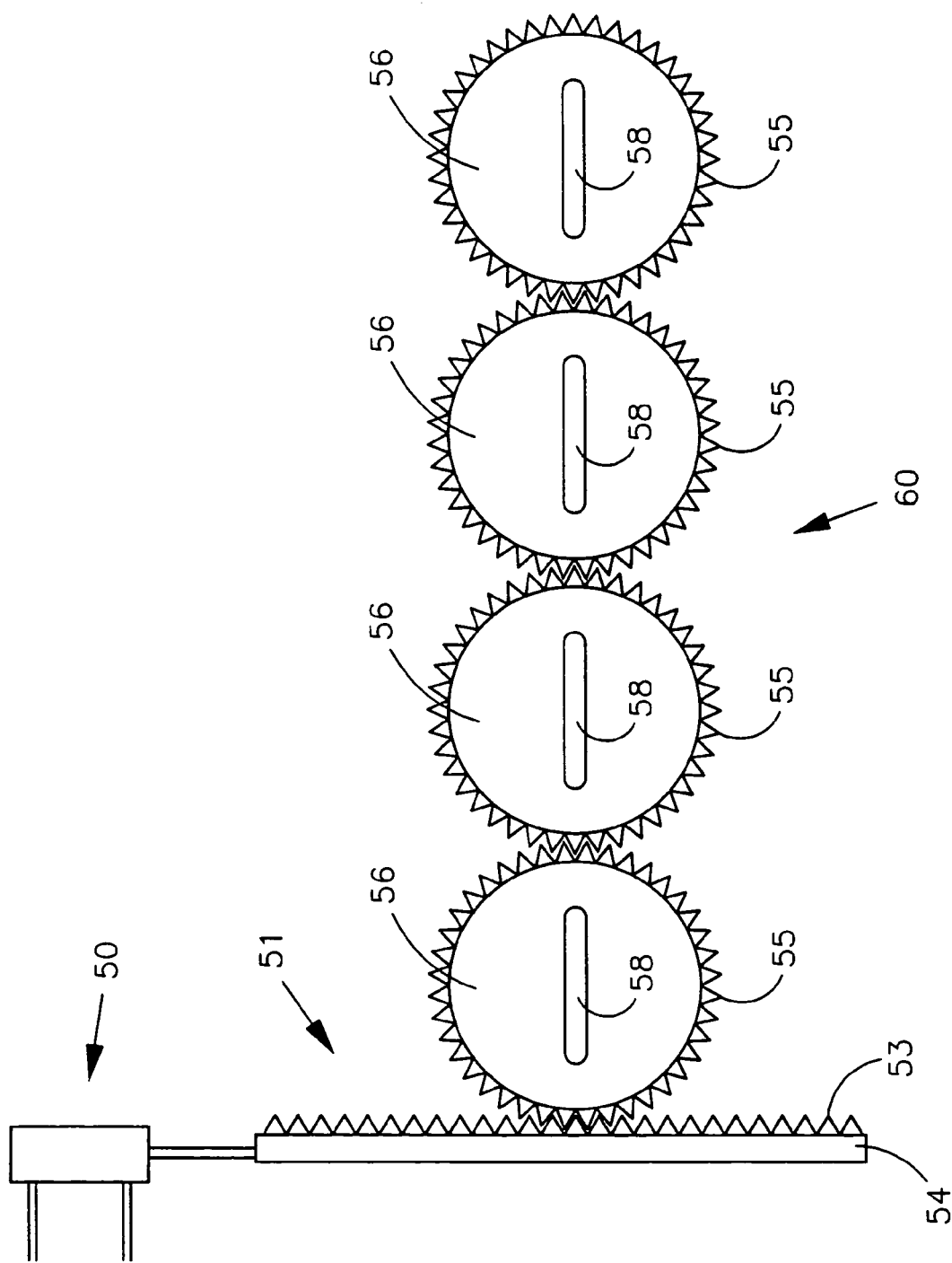
FIG. 9 is a front view of a plurality of twisting members.

FIG. 9 is a front view of Another exemplary embodiment having a plurality of twisting members 60. As shown in FIG. 9, each of the plurality of twisting members 60 is connected to another twisting member 60 thereby enabling geared ratchet 51 to articulate the plurality of twisting members 60.

Referring back to FIG. 5A and FIG. 5B, anvil 38 is provided for positioning and holding sealable material in a sealing position against sealing horn 39. Anvil 38 includes a contact surface 61 which is abuttingly contactable with sealing horn 39. During ultrasonic sealing, twisted tubular stock 59 is disposed on contact surface 61. Contact surface 61 defines an ultrasonic sealing zone 62 in which twisted tubular stock 59 is sealed. Contact surface 61 may optionally be provided with knurling to impart a roughened surface to the resulting seal.

Ultrasonic sealing horn 39 may be any suitable conventional ultrasonic sealing horn, such as, for example, a Branson series 2000 capable of producing ultrasonic vibrations of the order of about 15 to about 45 KHz. The sealing horn 39 is mounted on a drive shaft 63 which is pivotally movable to articulate the sealing horn 39 between a sealing position and a non-sealing position. In the non-sealing position, the sealing horn 39 is biased away from anvil 38. In the sealing position, the sealing horn 39 is biased toward anvil 38 by drive shaft 63. In the sealing position the sealing horn 39 is positioned to enable the twisted tubular stock disposed upon the anvil 38 to be sealed. Twisted tubular stock 59 forms sealed tubular stock 64 when sealing horn 39 forms a star seal 34.

At least one guide member 40 forms guide path 65 from the ultrasonic sealing zone 62 to first clamp 41. Sealed tubular stock 64 exits the ultrasonic sealing zone 62 via guide path 65 after an ultrasonic sealing cycle is completed. Guide member 40 can be a guide aperture, at least one guide bar, at least one guide plate, at least one guide pin, or combinations thereof. Preferably the guide member 40 is a pair of pins.

First clamp 41 is a conventional clamp that holds twisted tubular stock 59 in position during the ultrasonic sealing cycle. First clamp 41 also holds wadded tubular stock 49 before it is twisted to form twisted tubular stock 59. First clamp 41 articulates between an open position and a closed position. First clamp 41 is in the closed during the twisting cycle wherein wadded tubular stock 49 is twisted to form twisted tubular stock 59 and also during the sealing cycle wherein star seal 34 is formed. In the open position, first clamp 41 is biased away from wadded tubular stock 49 or twisted tubular stock 59. In the closed position, first clamp 41 is biased toward wadded tubular stock 49 during the twisting cycle and toward twisted tubular stock 59 during the sealing cycle such that wadded tubular stock 49 and twisted tubular stock 59 are held in position.

Second clamp 42 is a movable conventional clamp that advances sealed tubular stock 65 from first clamp 41 to cutting member 43. Second clamp 42 is formed to hold sealed tubular stock 64, pull the sealed tubular stock 64 through twisting member 52 to the desired length of bag 33, and push previously sealed bags through cutting member 43. Second clamp 42 articulates between a forward position and a back position. In the forward position, second clamp 42 is proximate first clamp 41 and biased away from cutting member 43. In the back position, second clamp 42 is proximate cutting member 43 and bias away from first clamp 41.

Cutting member 43 includes an upper blade 66 and lower blade 67. Actuation of the cutter member 43 causes reciprocal slicing movement of the upper blade 66 past the lower blade 67 and through the sealed tubular stock 64 at a point separated from star seal 34 formed therein to form a bag 33. For safety, an optional finger guard 68 is provided on one side of the cutting member 43, and a cutter guard 69 is provided on the other side of the cutting member 43 in order to minimize the risk of injury to the user during operation of the device.

Figure 10:
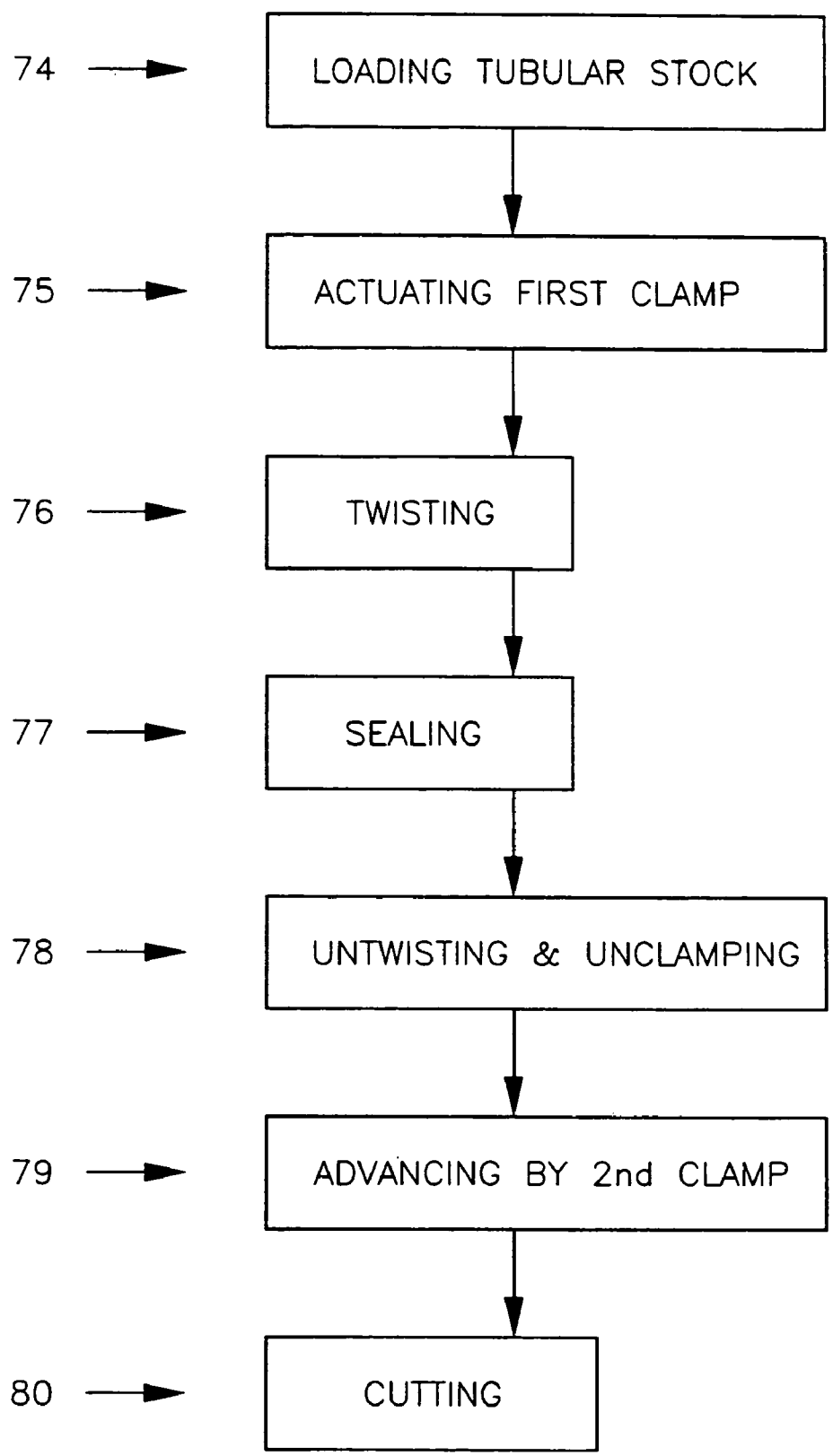
FIG. 10 is a flow chart of the method of making an exemplary bag formed from tubular stock and star sealed.

FIG. 10 is a flow chart of the method of making an exemplary bag formed from tubular stock and star sealed. The method described in FIG. 10 is performed by an ultrasonic sealing device capable of tightly twisting and thereby wadding tubular stock composed of films of the present invention. The method of making an exemplary bag formed from tubular stock includes the steps of loading tubular stock 74, actuating first clamp 75, twisting 76, ultrasonic sealing 77, untwisting and un-clamping 78, advancing 79, and cutting 80.

The methods of making bags comprise ultrasonic sealing techniques for sealing thermoplastic elastomer films, and for sealing cylindrical bags. The methods of creating higher seal strengths in thermoplastic elastomer bags permits bags to be fabricated at a lower cost because a lower thickness film can be used to make the bags. The methods of the present invention eliminate the need for mechanical sealing devices and also eliminate the problems associated with heat sealing techniques.

Figure 11:
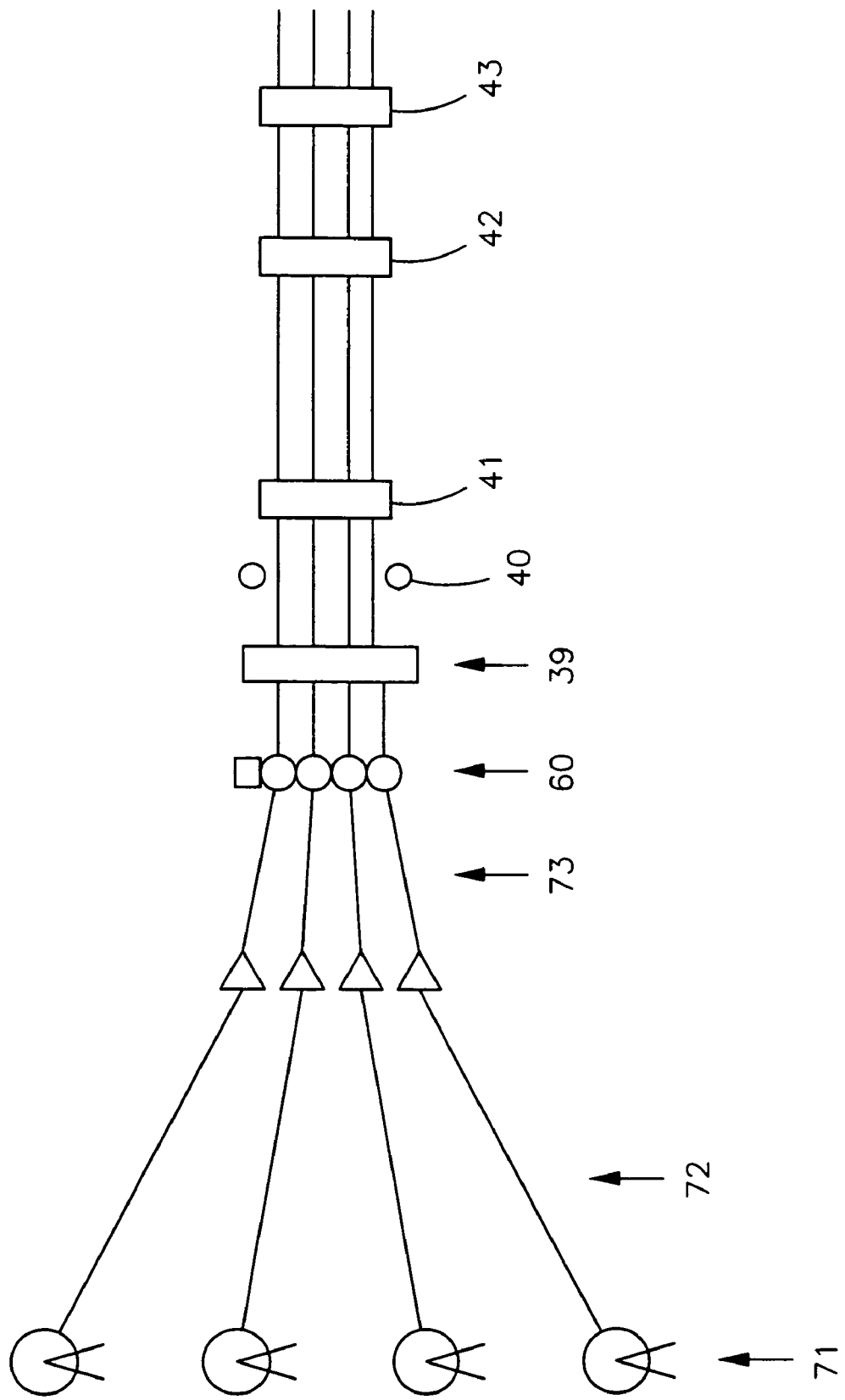
FIG. 11 is a top view of an exemplary star sealing bag machine having a plurality of twisting members.

Methods of star sealing bags are accomplished by operation of a sealing device according to the following exemplary steps. Referring to FIG. 5, FIG. 6, and FIG. 11 tubular stock 45 is loaded onto ultrasonic sealing machine 35 according to loading step 74 by pulling a sheet of tubular stock 45 off of a roll of film and advancing it toward a gathering horn 36 which wads up the tubular stock 45 into a rope like configuration to form wadded tubular stock 49. The wadded tubular stock 49 is advanced through aperture 58 of the twisting member 52, to an ultra sonic sealing zone 62. Wadded tubular stock 49 is advanced through ultra sonic sealing zone 62 and permitted to become unwadded under its own power. Wadded tubular stock 49 is corralled by at least one guide member 40 which helps to orient the wadded tubular stock 49 during the sealing cycle. Wadded tubular stock 49 is advanced past a first clamp 41 that holds wadded tubular stock 49 during the twisting cycle, and assists the guide member 40 in holding and positioning of wadded tubular stock 49 during sealing cycle. The first clamp 41 also prevents wadded tubular stock 49 from twisting beyond first clamp 41. Wadded tubular stock 49 is then operatively attached to a second clamp 42. Wadded tubular stock 49 is advanced through cutting member 43.

Once the tubular stock 45 is loaded onto ultrasonic sealing machine 35, operation of ultrasonic sealing machine 35 to star seal the bag is accomplished by actuating first clamp 41 according to actuating step 75 from an open position to a closed position then actuating geared ratchet 51 from an untwisted position to a twisted position by air cylinder 50 to perform twisting step 76. The movement of the geared ratchet 51 causes the twisting member 52 to rotate about an x-axis thereby causing the wadded tubular stock 49 to form twisted tubular stock 59 in ultrasonic sealing zone 62.

After wadded tubular stock 49 is twisted to form twisted tubular stock 59, the ultrasonic sealing horn 39 is actuated from a non-sealing position to a sealing position thereby capable of applying ultrasonic energy to twisted tubular stock 59 to form star seal 34. Ultrasonic sealing horn 39 applies ultrasonic energy to twisted tubular stock 59 and seals the twisted tubular stock 59 against anvil 38 according to sealing step 77.

The seal time, i.e. the period of time that energy is applied to the sealing horn while the bag is operatively associated with the sealing horn, is preferably set to a period of about 0.75 to about 2 seconds. This setting will vary according to the size of the bag being sealed, and/or the composition of the film used to fabricate the bag, and can be varied from about 0.25 to about 10 seconds. If the star seal 34 appears to be too thin, it may be necessary to reduce the seal time.

After the ultrasonic sealing horn 39 actuates from the sealing position to a non-sealing position, air cylinder 50 actuates geared ratchet 51 from a twisting position to a non-twisting position. Contemporaneously, first clamp 41 is actuated from a closed position to an open position according to untwisting/un-clamping step 78. Second clamp 42 grasps the sealed tubular stock 64 and advances sealed tubular stock 64 from the forward position to the back position so that sealed tubular stock 64 is advanced through twisting member 52 to the desired length of bag 33 according to advancing step 79. The second clamp 42 also pushes the previously sealed bags into cutting member 43 which cuts off bag 33 according to cutting step 80.

FIG. 11 is a top view of an exemplary star sealing bag machine having a plurality of twisting members. Preferably, a plurality of rolls of film 71 are employed make bag 33. When a plurality of rolls of film 71 are employed, a plurality of tubular stocks 72 are advanced through a plurality of twist members 60. The plurality of twist members 60 are oriented so that a plurality of wadded tubular stock 73 contemporaneously with one ultrasonic sealing horn, sealing horn 39. It is preferred to star seal from about 6 to about 9 wadded tubular stocks at one time. The sealing process is preferably fully automated.

After bags are fabricated they are filled with food products and sealed such that no contaminants can enter the bags. A preferred example of a fully automated process for food product packaging, for example beef or poultry, includes a rotating product table having vacuum nozzles for evacuating the bags prior to sealing. This automated process provides for the complete packaging of the food product with a minimal number of operators and with little, or preferably no, direct interaction between the operators and the food product. Preferably, a single operator places the open ended bags coming from a bagging station onto empty vacuum nozzles, with the evacuation and sealing being conducted automatically thereafter.

The films can also be used in vacuum bag applications as described in U.S. Pat. No. 5,123,985 to Evans entitled "Vacuum bagging apparatus and method including a thermoplastic elastomer film vacuum bag", which is herein incorporated by reference. Films are used in the low-pressure molding of various plastic, rubber, and resin bonded products, such as reinforced plastics, laminates, and bonded sandwich structures. The films of the present invention are used in vacuum bagging according to the following steps: film is applied to the surface of a product to form a laminate. The film conforms or adheres to the product. A vacuum bag is positioned over the film and the perimeter of the vacuum bag is sealed to the product. Air is drawn from the space between the vacuum bag and tool through a valve, built into the vacuum bag or product, which is connected to a vacuum pump. The product, laminate and vacuum bag assembly is loaded into an oven or autoclave so that heat and pressure can be applied to effect consolidation and cure of the laminate. While the area between the product and vacuum bag is maintained at reduced or atmospheric pressure, the pressure in the autoclave chamber is increased. The vacuum bag and product are thus compressed together and the laminate between them is consolidated to produce a dense, strong article. The vacuum bag approach provides a means of laminating and bonding at low pressures, i.e., 10 to 300 pounds per square inch. The system has many different uses and is able to accommodate workpieces of many shapes and sizes, limited only by the volume of the autoclave. In many cases, a single sided tool of modest construction, and hence cost, is all that is required. The tool only has to be impermeable and rigid at the process temperatures.

In addition, the films are suitable as a casing material for construction explosives. The construction industry packages individual explosive charges or a series of explosive charges within casings. The improved mechanical and barrier properties of the present invention are ideal for the packaging and casing of individual explosive charges or a series of explosive charges.

EXAMPLES

The following examples, which are not intended to be limiting, present certain embodiments and advantages of the present invention. Unless otherwise indicated, any percentages are on a weight basis.

Blended and multi-layered films were extruded with a blown film extrusion process. Blended and multi-layered films were extruded using conventional extruders. Multi-layered films were co-extruded using an array of extruderes including a three-layer Propak die with three extruders and a dual lip air ring. Extruder A had a 2" 30:1 screw and extruded non-elastic polyester. Extruder B had a 2-½"30:1 screw and also extruded non-elastic polyester. Extruder C had a 2-½" 30:1 screw and extruded thermoplastic elastomer. Extrusion conditions for extruder A include a melt temperature of 489 degrees Fahrenheit, a head pressure of 2900 pounds per square inch, and a screw speed of 31 revolutions per minute. Extrusion conditions for extruder B include a melt temperature 484 degrees Fahrenheit, a head pressure of 2313 psi, and screw speed of 24 revolutions per minute. Extrusion conditions for extruder C include a melt temperature of 450 degrees Fahrenheit, a head pressure of 2759 pounds per square inch, and a screw speed of 13 revolutions per minute. Extruder C always extruded the inside layer of the blown film bubble thereby causing the inner layer to be composed of thermoplastic elastomer. Alternatively, the films could have been produced using a two-layer die with two extruders and a single lip air ring. Tests were then performed on both the multi-layered and the blended films.

Multi-Layered TPE-E Films

Two multi-layered films were produced and compared to a reference film. The reference film, called Elastic Film, was composed of 100% thermoplastic elastomer. The film was extruded using only extruder C. The thermoplastic elastomer resin was Arnitel® EM-630 obtained from DSM engineering. The Elastic Film had a hi/lo gauge thickness of 0.00225/0.00175 inches and an average gauge thickness of 0.00225 inches as measured by ASTM test D-645. The Elastic Film had a melt point of 212 degrees Celsius as measured by ASTM Fisher Johns method.

The second film, called Test Film A, is a multi-layer thermoplastic elastomer film composed of an inner layer of thermoplastic elastomer of approximately 0.00056 inches thick extruded by extruder C and an outer layer of non-elastic polyester of approximately 0.00169 inches thick extruded by extruders A and B. The thermoplastic elastomer resin was Arnitelg EM-630 obtained from DSM engineering. The non-elastic polyester resin was Celanex® 1700A obtained from Ticona. The Test Film A had a hi/lo gauge thickness of 0.0026/0.00168 inches and an average gauge thickness of 0.00225 inches as measured by ASTM test D-645. The Test Film had a melt point of 222 degrees Celsius as measured by ASTM Fisher Johns method.

The physical and barrier properties of the two films were tested and measured as follows. Tensile modulus is a relative measure of film stiffness. The Test Film A is about five and a half times stiffer than the Elastic Film as measured by ASTM test D-645. The extra stiffness of Test Film A makes it easier to handle and easier to fabricate bags composed of the film. Tensile modulus test results are summarized in Table 1 as follows:

TABLE 1

| | Tensile Modulus (psi) MD | Std. Dev. | Tensile Modulus (psi) TD | Std. Dev. |
|---|---|---|---|---|
| Elastic Film | 35172 | 808 | 34101 | 2590 |
| Test Film A | 190448 | 2711 | 202895 | 12560 |

Tensile yield strength measure the force required to get a film to yield or stretch beyond its elastic region. Raw test results indicate that it takes 80% more force to stretch Test Film A as compared to the Elastic Film as measured by ASTM test D-882. The test results are summarized in Table 2 as follows:

TABLE 2

| | Tensile yield strength (psi) MD | Std. Dev. | Tensile yield strength (psi) TD | Std. Dev. |
|---|---|---|---|---|
| Elastic Film | 3255 | 1344.48 | 2620 | 90.87 |
| Test Film A | 5183 | 60.36 | 5566 | 154.6 |

Test results show that Test Film A would be less likely to stretch when stuffed under high pressure. The stretch of Test Film A would be more controlled then the stretch of the Elastic Film thereby providing a more consistent diameter when used to package sausage logs.

Tensile yield elongation measures the amount of elongation that occurs before the film finally stretches away and yields beyond its elastic point. Test Film A had significantly lower values making it more suitable for meat casings because a low tensile yield elongation means that film packaging will be tighter and more consistent when used to make meat sausages. Tensile yield elongation was measured by ASTM test D-882. The test results are summarized in Table 3 as follows:

TABLE 3

|  | Tensile Yield Elongation MD | Std. Dev. | Tensile Yield Elongation TD | Std. Dev. |
|---|---|---|---|---|
| Elastic Film | 19.5% | 1.12% | 18% | 1.12% |
| Test Film A | 5.1% | 0.22% | 5.6% | 0.82% |

Tensile break strength measures the amount of force needed to break the film. Both films had similar tensile break strengths. Tensile break strength was measured by ASTM test D-882. The test results are summarized in Table 4 as follows:

TABLE 4

|  | Tensile Break Strength (psi) MD | Std. Dev. | Tensile Break Strength (psi) TD | Std. Dev. |
|---|---|---|---|---|
| Elastic Film | 9143 | 702.27 | 8573 | 624 |
| Test Film A | 9496 | 742.36 | 6624 | 2421.61 |

Tensile break elongation measures the amount of stretch that occurs before a film breaks. Test Film A stretches less than the Elastic Film before it breaks. Tensile break elongation was measured by ASTM test D-882. The test results are summarized in Table 5 as follows:

TABLE 5

|  | Tensile Break Elongation MD | Std. Dev. | Tensile break elongation TD | Std. Dev. |
|---|---|---|---|---|
| Elastic Film | 533% | 30.03% | 534.7% | 22% |
| Test Film A | 400% | 16.7% | 337.9% | 76.92% |

Tear propagation measures the amount of energy required to continue a preexisting tear in a film whereas graves tear measures the amount of force to initially tear a film and then continue it. Bags preferably have high tear propagation and high graves tear values because they indicate that it will take a lot of energy to tear the bag. In contrast, meat casings require high graves tear values and moderate tear propagation values due to the way a meat packager strips a casing from section of packaged meat. Meat is generally unpacked by running a knife along the length of the section of meat and then peels back the film. If the knife cut is incomplete, the film must tear along the score mark or else the film will not strip off the meat. A low tear propagation number would make it easier to tear off the casing where the knife cut is incomplete. Films having a high tear propagation value will cause a meat packager to struggle to tear off the casing when knife cuts are incomplete.

The Test Film A had high graves tear values but more moderate tear propagation numbers, making it more suitable for meat casings. Tear propagation and graves tear values were measured by ASTM test D-1938 and D-1004 respectively. The test results are summarized in Tables 6 and 7 as follows:

TABLE 6

|  | Tear Propagation (gms-force) MD | Std. Dev. | Tear Propagation (gms-force) TD | Std. Dev. |
|---|---|---|---|---|
| Elastic Film | 612 | 37 | 673 | 23 |
| Test Film A | 204 | 32 | 232 | 20 |

TABLE 7

|  | Graves Tear (gms-force/mil) MD | Std. Dev. | Graves Tear (gms-force/mil) TD | Std. Dev. |
|---|---|---|---|---|
| Elastic Film | 473 | 23 | 520 | 32 |
| Test Film A | 560 | 97 | 728 | 40 |

Bond strength measures the adhesion between layers of plastic in co-extruded films. Test Film A would not delaminate which indicates that it will maintain it's integrity when used as a packaging film. Bond strength was measured using ASTM test F-904.

Seal strength indicates the amount of energy required to break a heat seal. Test Film A had a higher seal strength as compared to the Elastic Film. The seal data also shows that Test Film A has a broad heat seal window. Seal strength was measured using ASTM test F-88. The test results are summarized in Table 8 as follows:

TABLE 8

Seal Strength (lbs-force/in)

|  | Elastic Film | Std. Dev. | Test Film A | Std. Dev. |
|---|---|---|---|---|
| Impulse Setting 6 | 5.4 | 0.19 | 8.23 | 0.36 |
| Impulse Setting 8 | 5.43 | 0.12 | 8.58 | 0.34 |
| Rotary at 400 F, 3 sec. | 5.41 | 0.25 | 8.34 | 0.09 |
| Rotary at 425 F, 3 sec. | 5.29 | 0.12 | 8.36 | 0.33 |
| Rotary at 450 F, 3 sec. | 5.41 | 0.09 | 8.5 | 0.16 |
| Rotary at 475 F, 3 sec. | 5.38 | 0.08 | 8.5 | 0.26 |
| Rotary at 409 F, 3 sec. | 5.39 | 0.15 | 8.16 | 0.42 |
| Rotary at 500 F, 3 sec. | 5.32 | 0.08 | 8.3 | 0.44 |

Oxygen transmission rate measures the amount of oxygen that can permeate through a film. A permeability coefficient was used to standardize the oxygen transmission rate to a 1.0-mil film. When comparing films it's best to compare standardized values. The results show that Test Film A is thirteen times the barrier to oxygen as the Elastic Film. This translates to longer shelf life for meats packaged in the Test Film A. Similarly, water vapor transmission rates measures the amount of water vapor that can permeate through a film.

The permeability coefficient standardizes the rate to a 1.0-mil film. Again, when comparing films, it's best to compare standardized values. Test Film A is ten times better as a moisture barrier than the Elastic Film. Meat and other food products packaged in Test Film A will lose less water weight than meat and food packaged in the Elastic Film. Oxygen and water vapor transmission rates were measured by ASTM tests F-1927 and F-1249 respectively. The test results are summarized in Table 9 as follows:

TABLE 9

| | Oxygen Trans. Rate at 23 C and 50% RH cc/100 sq. in/day | Permeability Coefficient (cc-mil/100 sq. in./day) | Water Vapor Trans. Rate (100 F 90% RH gms/100 sq. in./day) | Permeability Coefficient (gms-mil/100 sq. in./day) |
|---|---|---|---|---|
| Elastic Film | 59.3 | 126.01 | 15.7 | 33.363 |
| Test Film A | 4.405 | 9.427 | 1.495 | 3.199 |

A cooking trial was also conducted to determine the bags usefulness in cooking applications. Ground beef was cooked in the Elastic Film and Test Film A and compared with MQ31 a standard nylon, cooking bag film manufactured by M & Q Packaging Corporation. During the test, the thermoplastic elastomer layer of Test Film A always contacted the meat. The films containing nylon MQ31 exhibited some browning. Testing also showed that the nylon films exhibits some adhesion to meat/fat, but the multi-layered films did not show significant adhesion to meat/fat. Lastly, the bags were examined to determine whether they leaked or oozed grease. No bags showed any grease oozing or leaking from the bag. Test Film A functioned well as a cooking bag and passed our cooking bag test.

Therefore, co-extruded films including a layer of thermoplastic elastomer and a layer of non-elastic polyester make a better cooking bag and meat casing when compared to mono-layer thermoplastic elastomer films because co-extruded films are less expensive, have better physical properties and superior barrier properties.

Blended TPE-E Films

Two blended monolayer thermoplastic films were produced and compared with films composed of each type of resin employed in the blended films. The first reference film, again called Elastic Film, was composed of about 100% thermoplastic elastomer. The thermoplastic elastomer resin used was Arnitel® EM-630 obtained from DSM engineering. The second reference film, called Non-Elastic Film, was composed of about 100% non-elastic polyester. The non-elastic polyester resin used was Celanex® 1700A obtained from Ticona. The films were extruded using a conventional extruder. The Elastic and Non-Elastic Films had a hi/lo gauge thickness of 0.0016/0.0014 inches and 0.0018/0.00135 respectively as measured by ASTM test D-645. The Elastic and Non-Elastic Films had melt points of 210 and 217 degrees Celsius respectively as measured by ASTM Fisher Johns method.

The first blended monolayer thermoplastic film, called Test Film B, was a blend of 60% thermoplastic elastomer and 40% non-elastic polyester. The thermoplastic elastomer resin employed was Arnitel® EM-630 obtained from DSM engineering. The non-elastic polyester resin used was Celanex® 1700A obtained from Ticona. The resins were admixed then extruded by conventional extruder. Test Film B had a hi/lo gauge thickness of 0.00185/0.0011 inches as measured by ASTM test D-645. Test Film B had a melt point of 215 degrees Celsius as measured by ASTM Fisher Johns method.

The second blended film, called Test Film C, was a blend of 80% thermoplastic elastomer and 20% non-elastic polyester. The thermoplastic elastomer resin employed was Arnitel® EM-630 obtained from DSM engineering. The non-elastic polyester resin used was Celanex® 1700A obtained from Ticona. The resins were admixed then extruded by conventional extruder. Test Film C had a hi/lo gauge thickness of 0.0017/0.00145 inches as measured by ASTM test D-645. Test Film C had a melt point of 218 degrees Celsius as measured by ASTM Fisher Johns method.

The physical and barrier properties of the two test films and the two reference films were tested and measured as follows. Tensile modulus is a relative measure of film stiffness. Test results indicate that test Film B is almost three times stiffer than the Elastic Film, but only about one fifth as stiff as the Non-Elastic Film as measured by ASTM test D-645. Test Film C is about twice as stiff as the Elastic film, but only about one seventh as stiff as the Non-Elastic Film as measured by ASTM test D-645. The results show that blending non-elastic polyester with thermoplastic elastomer increases film stiffness as compared to films composed substantially of thermoplastic elastomer.

Equipment used to star seal bags is easier to operate when stiffer films are sealed because less stiff films are more likely to jam the machine. Thus, blended monolayer thermoplastic films are easier to handle and easier to use when fabricating bags as compared to films of substantially thermoplastic elastomer. Tensile modulus test results are summarized in Table 10 as follows:

TABLE 10

| | Tensile Modulus (psi) MD | Std. Dev. | Tensile Modulus (psi) TD | Std. Dev. |
|---|---|---|---|---|
| Elastic Film | 43078 | 2380 | 42195 | 3834 |
| Test Film B | 113102 | 4781 | 107484 | 5882 |
| Test Film C | 81031 | 8392 | 77902 | 4921 |
| Non-Elastic Film | 570592 | 27045 | 566340 | 24858 |

Tensile yield strength measure the force required to get a film to yield or stretch beyond its elastic region. Test results show that Test Films B & C would be less likely to stretch when stuffed with meat under high pressure compared to the Elastic Film. Results indicate that it takes about 40% more force to stretch Test Film B and 25% more force to stretch Test Film C compared to the Elastic Film as measured by ASTM test D-882. The Non-Elastic Film would not stretch and therefore would not make a good meat packaging film. The packaging industry prefers meat packaging bags to be capable of some stretching because when the packaging is filled the bag must stretch a small amount instead of breaking or splitting at a seal. The test results are summarized in Table 11 as follows:

TABLE 11

| | Tensile yield strength (psi) MD | Std. Dev. | Tensile yield strength (psi) TD | Std. Dev. |
|---|---|---|---|---|
| Elastic Film | 2757 | 51 | 2707 | 71 |
| Test Film B | 3874 | 66 | 3848 | 104 |
| Test Film C | 3432 | 98 | 3389 | 94 |
| Non-Elastic Film | 0 | 0 | 0 | 0 |

Tensile yield elongation measures the amount of elongation that occurs before the film finally stretches away and yields beyond its elastic point. Test Films B & C had lower tensile yield elongation values than the Elastic Film thereby making them more suitable for meat casings. Films having a low tensile yield elongation will provide tighter and more consistently shaped meat sausages and can also be used as barriers to prevent meat bones from puncturing through packaging. Tensile yield elongation was measured by ASTM test D-882. The test results are summarized in Table 12 as follows:

TABLE 12

|  | Tensile Yield Elongation MD | Std. Dev. | Tensile Yield Elongation TD | Std. Dev. |
| --- | --- | --- | --- | --- |
| Elastic Film | 29.5% | 1.12% | 29% | 1.37% |
| Test Film B | 22.5% | 0% | 15.5% | 1.12% |
| Test Film C | 26.9% | 0.82% | 23.0% | 1.12% |
| Non-Elastic Film | 0% | 0% | 0% | 0% |

Tensile break strength measures the amount of force needed to break a film once stretched to its limit. Test films B and C had similar tensile break strength values however, both films had higher break strength values then the Non-Elastic Film. Thus, the blended monolayer thermoplastic films are better materials for shipping meat and other heavy materials. Tensile break strength was measured by ASTM test D-882. The test results are summarized in Table 13 as follows:

TABLE 13

|  | Tensile Break Strength (psi) MD | Std. Dev. | Tensile Break Strength (psi) TD | Std. Dev. |
| --- | --- | --- | --- | --- |
| Elastic Film | 9876 | 957 | 9155 | 1255 |
| Test Film B | 9423 | 905 | 9570 | 392 |
| Test Film C | 10053 | 890 | 8718 | 1110 |
| Non-Elastic Film | 6866 | 553 | 6408 | 644 |

Tensile break elongation measures the amount of stretch that occurs before a film breaks. Test Films B & C stretch about as much as the Elastic Film. This elastic characteristic makes blended monolayer thermoplastic films good material for use in meat packaging. Tensile break elongation was measured by ASTM test D-882. The test results are summarized in Table 14 as follows:

TABLE 14

|  | Tensile Break Elongation MD | Std. Dev. | Tensile break elongation TD | Std. Dev. |
| --- | --- | --- | --- | --- |
| Elastic Film | 628.5% | 34.82% | 691.8% | 46.29% |
| Test Film B | 568.1% | 31.81% | 635% | 11.23% |
| Test Film C | 594.6% | 27.04% | 637.8% | 35.3% |
| Non-Elastic Film | 0% | 0% | 0% | 0% |

Tear propagation measures the amount of energy required to continue a preexisting tear in a film whereas graves tear measures the amount of force to initially tear a film and then continue it. Bags preferably have high tear propagation and high graves tear values because these results indicate that it will take a lot of energy to tear the bag. In contrast, meat casings require high graves tear values and moderate tear propagation values due to the way a meat packager strips a casing from section of packaged meat. Meat is generally unpacked by running a knife along the length of the section of meat and then peeling back the film. If the knife cut is incomplete, the film must tear along the score mark or else the film will not strip off the meat. A low tear propagation number would make it easier to tear off the casing where the knife cut is incomplete. Films having a high tear propagation value will cause a meat packager to struggle to tear off the casing when knife cuts are incomplete.

Blended monolayer thermoplastic films containing higher amounts of non-elastic polyester tend to have lower tear propagation values but also tend to increase graves tear values. Test results show that blended films provide the best balance of tear propagation and graves tear properties when compared to thermoplastic elastomer films and non-elastic polyester films. Tear propagation and graves tear values were measured by ASTM test D-1938 and D-1004 respectively. The test results are summarized in Tables 15 and 16 as follows:

TABLE 15

|  | Tear Propagation (gms-force) MD | Std. Dev. | Tear Propagation (gms-force) TD | Std. Dev. |
| --- | --- | --- | --- | --- |
| Elastic Film | 442 | 26 | 494 | 13 |
| Test Film B | 329 | 41 | 431 | 11 |
| Test Film C | 351 | 57 | 447 | 23 |
| Non-Elastic Film | 133 | 20 | 201 | 20 |

TABLE 16

|  | Graves Tear (gms-force/mil) MD | Std. Dev. | Graves Tear (gms-force/mil) TD | Std. Dev. |
| --- | --- | --- | --- | --- |
| Elastic Film | 426 | 16 | 432 | 10 |
| Test Film B | 523 | 93 | 562 | 51 |
| Test Film C | 481 | 40 | 494 | 6 |
| Non-Elastic Film | 770 | 79 | 716 | 42 |

A film's seal strength indicates the amount of energy required to break a heat seal. Heat seals were made with Test Films B & C using a wire impulse sealer and a rotary Belt sealer and then the seals were pulled apart with an Instron tester. Seal strength was measured using ASTM test F-88. Both Test Films B & C sealed well. During testing Test Films B & C would break before the seal would fail. The Non-Elastic Film experienced seal failure at 5 to 6.5 lbs/in. Thus, blending thermoplastic elastomer with non-elastic polyester improves the seal strength of the non-elastic polyester films. The test results are summarized in Table 17 as follows:

TABLE 17

| | Elastic Film | Std. Dev. | Test Film B | Std. Dev. | Test Film C | Std. Dev. | Non-Elastic Film | Std. Dev. |
|---|---|---|---|---|---|---|---|---|
| | Seal Strength (lbs-force/in) | | | | | | | |
| Impulse Setting 8 | 5.15 | 0.05 | 6.13 | 0.36 | 5.95 | 0.16 | 5.01 | 1.63 |
| Rotary at 425F, 3 sec. | 4.87 | 0.11 | 6.89 | 0.19 | 5.75 | 0.04 | 5.01 | 1.63 |
| Rotary at 475F, 3 sec. | 5.01 | 0.21 | 6.81 | 0.23 | 6.07 | 0.12 | 6.49 | 1.24 |

Star sealing techniques where also used to seal Test Films B & C according to the method described above. Optimum operation conditions for the untrasonic sealing machine were determined prior to sealing the bags. Bags made from Test Films B & C were then pressurized using compressed air. A seal failure was indicated by a seal break or a loss of pressure within the bag. Test results show that 55% of the bags made from the Elastic Film failed, 33% of the bags made from the Non-Elastic Film failed. In contrast, only 5% of the bags made from Test Film B failed, and no bags made from Test Film C failed. It is clear that bags made from blended films yield a much better star seal when compared to bags made from only thermoplastic elastomer or non-elastic polyester.

A film's oxygen transmission rate measures the amount of oxygen that can permeate through a film. A permeability coefficient was used to standardize the oxygen transmission rate to a 1.0-mil film. When comparing films it is best to compare standardized values so that deviations in film thickness do not distort the test results. The results show that blended monolayer thermoplastic films provide a much better oxygen barrier when compared to films made from only thermoplastic elastomer. Test Film B had one fourth the oxygen transmission rate of the Elastic Film. Test Film C had half the oxygen transmission rate of the Elastic Film. This translates to longer shelf life for meats packaged in blended films.

Similarly, water vapor transmission rates measures the amount of water vapor that can permeate through a film. The permeability coefficient standardizes the rate to a 1.0-mil film. Again, when comparing films, it's best to compare standardized values. Test Film B had one third the water vapor transmission rate of the Elastic Film. Test Film C had half the water vapor transmission rate of the Elastic Film. Meat and other food products packaged in Test Films B & C will lose less water weight than meat and food packaged in the Elastic Film. Oxygen and water vapor transmission rates were measured by ASTM tests F-1927 and F-1249 respectively. The test results are summarized in Table 18 as follows:

TABLE 18

| | Oxygen Trans. Rate at 23 C and 50% RH cc/100 sq. in/day | Permeability Coefficient (cc-mil/100 sq. in./day) | Water Vapor Trans. Rate (100 F 90% RH gms/100 sq. in./day) | Permeability Coefficient (gms-mil/ 100 sq. in./day) |
|---|---|---|---|---|
| Elastic Film (.00225 in. thick) | 59.3 | 126.01 | 15.7 | 33.363 |

TABLE 18-continued

| | Oxygen Trans. Rate at 23 C and 50% RH cc/100 sq. in/day | Permeability Coefficient (cc-mil/100 sq. in./day) | Water Vapor Trans. Rate (100 F 90% RH gms/100 sq. in./day) | Permeability Coefficient (gms-mil/ 100 sq. in./day) |
|---|---|---|---|---|
| Test Film B (.0015 in. thick) | 21.0 | 34.65 | 6.25 | 10.313 |
| Test Film C (.0015 in. thick) | 39.45 | 62.134 | 10.85 | 17.089 |
| Non-Elastic Film (.0015 in. thick) | 4.465 | 7.256 | 1.325 | 2.153 |

A cooking trial was also conducted to determine the bags usefulness in cooking applications. Ground beef was cooked in bags made from each of the films for 3 hours at 350 degrees Fahrenheit and compared with MQ31 a standard nylon, cooking bag film manufactured by M & Q Packaging Corporation. The films containing nylon MQ31 exhibited some browning. The blended bags did not experience noticeable discoloration. The bags were also examined to determine whether any meat/fat stuck to the bag. It was observed that the MQ31 bag and the bag made from Non-Elastic Film exhibited adhesion to fat. Bags made from Test Films B & C did not exhibit significant adhesion to fat. Lastly, the bags were examined to determine whether they leaked or oozed grease. No bags showed any grease oozing or leaking from the bag. Thus the bags made from blended films make better cooking bags than bags made from nylon or non-elastic polyester because they have less affinity to meat proteins and can be removed more easily from cooked meats.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention

What is claimed is:

1. A high temperature food preparation film comprising:
    a blended monolayer thermoplastic elastomer film for use in high temperature cooking applications comprising:
        from about 10 to about 40 weight percent, based on the total weight of said blended monolayer thermoplastic film, of thermoplastic elastomer block copolymers; and
        from about 60 to about 90 weight percent, based on the total weight of said blended monolayer thermoplastic film, of non-elastic polyesters;
    said high temperature cooking applications occurring at from about 212 degrees Fahrenheit to about 400 degrees Fahrenheit;
        said blended monolayer thermoplastic elastomer film providing a water vapor barrier having a transmission coefficient of less than about 20 gms/100 in$^2$/day, and an oxygen barrier coefficient of less than about 100 cc-mil/100 in$^2$/day.

2. The high temperature food preparation film of claim 1, wherein said blended monolayer thermoplastic film has a tensile yield strength of at least 2900 pounds per square inch.

3. The high temperature food preparation film of claim 1, wherein said thermoplastic elastomer block copolymers are selected from a group consisting of polyester-ester block copolymers, polyether-ester block copolymers, or combinations thereof.

4. The high temperature food preparation film of claim 1, wherein said non-elastic polyester is a reaction product of a carboxylic acid and a diol.

5. The high temperature food preparation film of claim 1, wherein the non-elastic polyester is polybutylene terepthalate.

6. The high temperature food preparation film of claim 1, wherein food products in contact with said blended monolayer thermoplastic elastomer film during said high temperature food preparation are not damaged due to adherence of said blended monolayer thermoplastic elastomer film to said food product during said high temperature food preparation.

7. A high temperature food preparation film comprising:
a multi-layered thermoplastic elastomer film comprising:
a first layer comprising thermoplastic elastomer block copolymers; and
a second layer comprising non-elastic polyesters;
wherein said high temperature food preparation occurs at from about 212 degrees Fahrenheit to about 400 degrees Fahrenheit;
said multi-layered thermoplastic elastomer film not substantially adhering to food during said high temperature food preparation;
said multi-layered thermoplastic elastomer film providing a water vapor barrier having a transmission coefficient of less than about 20 gms/100 in$^2$/day, and an oxygen barrier coefficient of less than about 100 cc-mil/100 in$^2$/day.

8. The high temperature food preparation film of claim 7, wherein said multi layer thermoplastic film has a tensile yield strength of at least 4000 pounds per square inch.

9. The high temperature food preparation film of claim 7, wherein said thermoplastic elastomer block copolymers are selected from a group consisting of polyester-ester block copolymers, polyether-ester block copolymers, or combinations thereof.

10. The high temperature food preparation film of claim 7, wherein said non-elastic polyester is the reaction product of a carboxylic acid and a diol.

11. The high temperature food preparation film of claim 7, wherein the non-elastic polyester is polybutylene terepthalate.

12. The high temperature food preparation film of claim 7, wherein said first layer comprises an interior film layer and said second layer comprises an exterior film layer.

13. The high temperature food preparation film of claim 7, wherein said first layer has a film thickness from about 0.0001 to about 0.01 inches and said second layer has a film thickness from about 0.0001 to about 0.01 inches.

14. The high temperature food preparation film of claim 7, further comprising at least one additional layer comprising thermoplastic elastomer block copolymers, non-elastic polyesters, or a combination thereof.

15. The high temperature food preparation film of claim 7, wherein said multi-layered films are fabricated by:
co-extruding said first and second layers;
extruding the first and second layers separately, disposing the second layer on the first layer, and forming the multi-layered film by rolling the first layer and second layer between a heated roller; or
by disposing the first layer and the second layer between an interleaving adhesive layer.

16. The high temperature food preparation film of claim 7, wherein food products in contact with said multi-layered thermoplastic elastomer film during said high temperature food preparation are not damaged due to adherence of said multi-layered thermoplastic elastomer film to said food product during said high temperature food preparation.

17. A high temperature food preparation bag comprising:
a sealed end;
at least one side wall extending away from said sealed end, each of said at least one side wall having a distal edge; and
an open end defined by said distal edge;
said bag formed from a blended thermoplastic elastomer film comprising:
from about 10 to about 40 weight percent, based on the total weight of said thermoplastic film, of thermoplastic elastomer block copolymers; and
from about 60 to about 90 weight percent, based on the total weight of said thermoplastic film, of non-elastic polyesters;
wherein said high temperature food preparation occurs at from about 212 degrees Fahrenheit to about 400 degrees Fahrenheit;
said thermoplastic elastomer film not substantially adhering to food during said high temperature food preparation;
said thermoplastic elastomer film providing a water vapor barrier having a transmission coefficient of less than about 20 gms/100 in$^2$/day, and an oxygen barrier coefficient of less than about 100 cc-mil/100 in$^2$/day.

18. The high temperature food preparation bag of claim 17, wherein said blended monolayer thermoplastic film has a tensile yield strength of at least 2900 pounds per square inch.

19. The high temperature food preparation bag of claim 17 wherein said thermoplastic elastomer block copolymers are selected from a group consisting of polyester-ester block copolymers, polyether-ester block copolymers, or combinations thereof.

20. The high temperature food preparation bag of claim 17 wherein the non-elastic polyester is polybutylene terepthalate.

21. The high temperature food preparation bag of claim 17, wherein food products in contact with said blended thermoplastic elastomer film during said high temperature food preparation are not damaged due to adherence of said blended thermoplastic elastomer film to said food product during said high temperature food preparation.

22. A high temperature food preparation bag comprising:
a sealed end;
at least one side wall extending away from said sealed end, each of said at least one side wall having a distal edge; and
an open end defined by said distal edge;
said bag formed from a multi-layered film comprising:
a first layer comprising thermoplastic elastomer block copolymers; and
a second layer comprising non-elastic polyesters;
wherein said high temperature food preparation occurs at from about 212 degrees Fahrenheit to about 400 degrees Fahrenheit;
said multi-layered thermoplastic elastomer film not substantially adhering to food during said high temperature food preparation said multi-layered thermoplastic elastomer film providing a water vapor barrier having a transmission coefficient of less than about 20 gms/100 in$^2$/day, and an oxygen barrier coefficient of less than about 100 cc-mil/100 in$^2$/day.

23. The high temperature food preparation bag of claim 22, wherein said multi-layered film has a tensile yield strength of at least 4000 pounds per square inch.

24. The high temperature food preparation bag of claim 22 wherein said first layer that comprises an interior film layer and said second layer comprises an exterior layer.

25. The high temperature food preparation bag of claim 22 wherein said first layer has a film thickness from about 0.0001 to about 0.01 inches and said second layer has a film thickness from about 0.0001 to about 0.01 inches.

26. The high temperature food preparation bag of claim 22 wherein said thermoplastic film further comprises at least one additional layer comprising thermoplastic elastomer block copolymers, non-elastic polyesters, or a combination thereof.

27. The high temperature food preparation bag of claim 22 wherein said thermoplastic elastomer block copolymers are selected from a group consisting of polyester-ester block copolymers, polyether-ester block copolymers, or combinations thereof.

28. The high temperature food preparation bag of claim 22 wherein the non-elastic polyester is polybutylene terepthalate.

29. The high temperature food preparation bag of claim 22, wherein food products in contact with said multi-layered thermoplastic elastomer film during said high temperature food preparation are not damaged due to adherence of said thermoplastic elastomer film to said food product during said high temperature food preparation.

30. A high temperature food preparation film comprising:
a blended monolayer thermoplastic elastomer film for use in high temperature cooking applications comprising:
from about 60 to about 90 weight percent, based on the total weight of said blended monolayer thermoplastic film, of thermoplastic elastomer block copolymers; and
from about 10 to about 40 weight percent, based on the total weight of said blended monolayer thermoplastic film, of non-elastic polyesters;
said high temperature cooking applications occurring at from about 212 degrees Fahrenheit to about 400 degrees Fahrenheit;
said blended monolayer thermoplastic elastomer film providing a water vapor barrier having a transmission coefficient of less than about 20 gms/100 in$^2$/day, and an oxygen barrier coefficient of less than about 100 cc-mil/100 in$^2$/day.

31. A high temperature food preparation bag comprising:
a sealed end;
at least one side wall extending away from said sealed end, each of said at least one side wall having a distal edge; and
an open end defined by said distal edge;
said bag formed from a blended thermoplastic elastomer film comprising:
from about 60 to about 90 weight percent, based on the total weight of said thermoplastic film, of thermoplastic elastomer block copolymers; and
from about 10 to about 40 weight percent, based on the total weight of said thermoplastic film, of non-elastic polyesters;
wherein said high temperature food preparation occurs at from about 212 degrees Fahrenheit to about 400 degrees Fahrenheit;
said thermoplastic elastomer film providing a water vapor barrier having a transmission coefficient of less than about 20 gms/100 in$^2$/day, and an oxygen barrier coefficient of less than about 100 cc-mil/100 in$^2$/day.

* * * * *